(12) United States Patent
Kitazato

(10) Patent No.: US 10,433,016 B2
(45) Date of Patent: Oct. 1, 2019

(54) RECEPTION APPARATUS, RECEPTION METHOD, TRANSMISSION APPARATUS, AND TRANSMISSION METHOD

(71) Applicant: SONY CORPORATION, Tokyo (JP)

(72) Inventor: Naohisa Kitazato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/544,540

(22) PCT Filed: Feb. 3, 2016

(86) PCT No.: PCT/JP2016/053137
§ 371 (c)(1),
(2) Date: Jul. 19, 2017

(87) PCT Pub. No.: WO2016/132898
PCT Pub. Date: Aug. 25, 2016

(65) Prior Publication Data
US 2018/0041808 A1    Feb. 8, 2018

(30) Foreign Application Priority Data
Feb. 17, 2015   (JP) ................................ 2015-028294

(51) Int. Cl.
*H04N 21/435*   (2011.01)
*H04N 21/472*   (2011.01)
(Continued)

(52) U.S. Cl.
CPC ... *H04N 21/47211* (2013.01); *H04N 7/17363* (2013.01); *H04N 21/2347* (2013.01);
(Continued)

(58) Field of Classification Search
None
See application file for complete search history.

(56) References Cited

U.S. PATENT DOCUMENTS 6,496,928 B1 * 12/2002 Deo ................. G06F 1/3209
380/270
6,671,879 B1   12/2003 Schlarb et al.
(Continued)

FOREIGN PATENT DOCUMENTS

EP   2 709 372 A1   3/2014
EP   2 750 309 A1   7/2014
(Continued)

OTHER PUBLICATIONS

International Search Report dated May 10, 2016 in PCT/JP2016/053137 filed Feb. 3, 2016.

*Primary Examiner* — Mulugeta Mengesha
*Assistant Examiner* — Charles N Hicks
(74) *Attorney, Agent, or Firm* — Oblon, McClelland, Maier & Neustadt, L.L.P.

(57) ABSTRACT

The present technology relates to a reception apparatus, a reception method, a transmission apparatus, and a transmission method that make it possible to do a promotion for a non-subscriber to a pay broadcast service more flexibly. The reception apparatus receives broadcast content that is provided as a pay broadcast service and transmitted in a scrambled manner, acquires a subscription check application for checking presence of a subscription to the pay broadcast service depending on information indicating presence of the subscription check application, the information being included in control information including information regarding a structure of the broadcast content, and controls an operation of the subscription check application. The present technology is applicable, for example, to a television receiver capable of receiving a digital broadcast signal.

16 Claims, 33 Drawing Sheets

(51) Int. Cl.
   *H04N 21/2362*  (2011.01)
   *H04N 21/2347*  (2011.01)
   *H04N 7/173*    (2011.01)
   *H04N 21/63*    (2011.01)

(52) U.S. Cl.
   CPC ....... *H04N 21/2362* (2013.01); *H04N 21/435* (2013.01); *H04N 21/63* (2013.01)

(56) References Cited

U.S. PATENT DOCUMENTS

| | | | |
|---|---|---|---|
| 9,693,083 B1* | 6/2017 | Yang | H04N 21/25816 |
| 2005/0047596 A1 | 3/2005 | Suzuki | |
| 2009/0069052 A1* | 3/2009 | Jain | G06K 19/07739 455/558 |

FOREIGN PATENT DOCUMENTS

| JP | 2002-514863 A | 5/2002 |
|---|---|---|
| JP | 2005-102150 A | 4/2005 |
| JP | 2007-318798 A | 12/2007 |
| JP | 2013-9356 A | 1/2013 |
| JP | 2015-23479 A | 2/2015 |

* cited by examiner

FIG. 9

| DATA STRUCTURE | NUMBER OF BITS | DATA NOTATION |
|---|---|---|
| PA_Message() { | | |
|   message_id | 16 | uimsbf |
|   version | 8 | uimsbf |
|   length | 32 | uimsbf |
|   extension{ | | |
|     number_of_tables | 8 | uimsbf |
|     for (i=0; i<N; i++) { | | |
|       table_id | 8 | uimsbf |
|       table_version | 8 | uimsbf |
|       table_length | 16 | uimsbf |
|     } | | |
|   } | | |
|   message_payload{ | | |
|     for (i=0; i<N; i++) { | | |
|       table() | | |
|     } | | |
|   } | | |
| } | | |

*FIG. 10*

| DATA STRUCTURE | NUMBER OF BITS | DATA NOTATION |
|---|---|---|
| M2section_Message() { | | |
|     message_id | 16 | uimsbf |
|     version | 8 | uimsbf |
|     length | 16 | uimsbf |
|     table_id | 8 | uimsbf |
|     section_syntax_indicator | 1 | bslbf |
|     '1' | 1 | bslbf |
|     '11' | 2 | bslbf |
|     section_length | 12 | uimsbf |
|     table_id_extension | 16 | uimsbf |
|     '11' | 2 | bslbf |
|     version_number | 5 | uimsbf |
|     current_next_indicator | 1 | bslbf |
|     section_number | 8 | uimsbf |
|     last_section_number | 8 | uimsbf |
|     for(i=0; i<N; i++) { | | |
|         signaling_data_byte | 8 | bslbf |
|     } | | |
|     CRC_32 | 32 | rpchof |
| } | | |

FIG. 11

| DATA STRUCTURE | NUMBER OF BITS | DATA NOTATION |
|---|---|---|
| MPT () { | | |
|     table_id | 8 | uimsbf |
|     version | 8 | uimsbf |
|     length | 16 | uimsbf |
|     reserved | 6 | bslbf |
|     MPT_mode | 2 | bslbf |
|     MMT_package_id_length | 8 | uimsbf |
|     for(i=0;i<N;i++) { | | |
|         MMT_package_id_byte | 8 | uimsbf |
|     } | | |
|     MPT_descriptors_length | 16 | uimsbf |
|     for(i=0;i<N;i++) { | | |
|         MPT_descriptors_byte | | |
|     } | | |
|     number_of_assets | 8 | uimsbf |
|     for(i=0;i<N;i++) { | | |
|         asset_id_length | | |
|         for(j=0;j<M;j++) { | | |
|             asset_id_byte | 8 | uimsbf |
|         } | | |
|         mime_type | 32 | uimsbf |
|         reserved | 7 | bslbf |
|         asset_clock_relation_flag | 1 | bslbf |
|         location_count | 8 | uimsbf |
|         for(i=0;i<M;j++) { | | |
|             MMT_general_location_info() | | |
|         } | | |
|         asset_descriptors_length | 16 | uimsbf |
|         for (k=0;k<M;k++) { | | |
|             asset_descriptors_byte | | |
|         } | | |
|     } | | |
| } | | |

FIG. 12

| DATA STRUCTURE | NUMBER OF BITS | DATA NOTATION |
|---|---|---|
| MMT_general_location_info() { | | |
|     location_type | 8 | uimsbf |
|     if(location_type==0x00) { | | |
|         packet_id | 16 | uimsbf |
|     } | | |
|     if(location_type==0x01) { | | |
|         ipv4_src_addr | 32 | uimsbf |
|         ipv4_dst_addr | 32 | uimsbf |
|         dst_port | 16 | uimsbf |
|         packet_id | 16 | uimsbf |
|     } | | |
|     if(location_type==0x02) { | | |
|         ipv6_src_addr | 128 | uimsbf |
|         ipv6_dst_addr | 128 | uimsbf |
|         dst_port | 16 | uimsbf |
|         packet_id | 16 | uimsbf |
|     } | | |
|     if(location_type==0x03) { | | |
|         network_id | 16 | uimsbf |
|         MPEG_2_transport_stream_id | 16 | uimsbf |
|         reserved | 3 | uimsbf |
|         MPEG_2_PID | 13 | uimsbf |
|     } | | |
|     if(location_type==0x04) { | | |
|         ipv6_src_addr | 128 | uimsbf |
|         ipv6_dst_addr | 128 | uimsbf |
|         dst_port | 16 | uimsbf |
|         reserved | 3 | uimsbf |
|         MPEG_2_PID | 13 | uimsbf |
|     } | | |
|     if(location_type==0x05) { | | |
|         URL_length | 8 | uimsbf |
|         for(i=0;i<N;i++) { | | |
|             URL_byte | 8 | char |
|         } | | |
|     } | | |
| } | | |

FIG. 14

| DATA STRUCTURE | NUMBER OF BITS | DATA NOTATION |
|---|---|---|
| Data_Directory_Management_Table() { | | |
|     table_id | 8 | uimsbf |
|     version | 8 | uimsbf |
|     length | 16 | uimsbf |
|     base_directory_path_length | 8 | uimsbf |
|     for(i=0; i<base_directory_path_length; i++) { | | |
|         base_directory_path_byte | 8 | uimsbf |
|     } | | |
|     num_of_directory_nodes | 16 | uimsbf |
|     for(i=0; i<num_of_directory_nodes; i++) { | | |
|         node_tag | 16 | uimsbf |
|         directory_node_version | 8 | uimsbf |
|         directory_node_path_length | 8 | uimsbf |
|         for(j=0; j<directory_node_path_length; j++) { | | |
|             directory_node_path_byte | 8 | char |
|         } | | |
|         num_of_files | 16 | uimsbf |
|         for(j=0; j<num_of_files; j++) { | | |
|             node_tag | 16 | uimsbf |
|             file_name_length | 8 | uimsbf |
|             for(k=0; k<file_name_length; k++) { | | |
|                 file_name_byte | 8 | char |
|             } | | |
|         } | | |
|     } | | |
| } | | |

FIG. 15

| DATA STRUCTURE | NUMBER OF BITS | DATA NOTATION |
|---|---|---|
| Data_Asset_Management_Table() { | | |
|     table_id | 8 | uimsbf |
|     version | 8 | uimsbf |
|     length | 16 | uimsbf |
|     num_of_data_components | 8 | uimsbf |
|     for(i=0;i<num_of_data_components;i++) { | | |
|         transaction_id | 32 | uimsbf |
|         component_tag | 16 | uimsbf |
|         download_id | 32 | uimsbf |
|         num_of_mpus | 8 | uimsbf |
|         for(j=0;j<num_of_mpus;j++) { | | |
|             mpu_sequence_number | 32 | uimsbf |
|             num_of_items | 8 | uimsbf |
|             for(k=0;k<num_of_items;k++) { | | |
|                 item_ID | 32 | uimsbf |
|                 node_tag | 16 | uimsbf |
|                 item_size | 32 | uimsbf |
|                 item_version | 8 | uimsbf |
|                 checksum_flag | 1 | bslbf |
|                 reserved_future_use | 7 | bslbf |
|                 if(checksum_flag==1) { | | |
|                     item_checksum | 32 | uimsbf |
|                 } | | |
|                 item_info_length | 8 | uimsbf |
|                 for(l=0;l<item_info_length;l++) { | | |
|                     item_info_byte | 8 | uimsbf |
|                 } | | |
|             } | | |
|             mpu_info_length | 8 | uimsbf |
|             for(m=0;m<mpu_info_length;m++) { | | |
|                 mpu_info_byte | 8 | uimsbf |
|             } | | |
|         } | | |
|         descriptor_loop_length | 16 | uimsbf |
|         for(n=0;n<N;n++) { | | |
|             descriptor() | | |
|         } | | |
|     } | | |
| } | | |

FIG. 16

| DATA STRUCTURE | NUMBER OF BITS | DATA NOTATION |
|---|---|---|
| Data_Content_Configuration_Table() { | | |
|     table_id | 8 | uimsbf |
|     version | 8 | uimsbf |
|     length | 16 | uimsbf |
|     num_of_contents | 8 | uimsbf |
|     for(i=0;i<num_of_contents;i++){ | | |
|         content_id | 16 | uimsbf |
|         content_version | 8 | uimsbf |
|         content_size | 32 | uimsbf |
|         PU_info_flag | 1 | bslbf |
|         reserved_for_future_use | 7 | bslbf |
|         if(PU_info_flag==1){ | | |
|             number_of_PUs | 8 | uimsbf |
|             for(j=0;j<number_of_PUs;j++){ | | |
|                 PU_tag | 8 | uimsbf |
|                 PU_size | 32 | uimsbf |
|                 number_of_member_nodes | 8 | uimsbf |
|                 for(k=0;k<number_of_member_nodes;k++){ | | |
|                     node_tag | 16 | uimsbf |
|                 } | | |
|                 PU_info_length | 8 | uimsbf |
|                 for(k=0;k<descriptor_length;k++){ | | |
|                     PU_info_byte | 8 | uimsbf |
|                 } | | |
|             } | | |
|         } | | |
|         else{ | | |
|             number_of_nodes | 16 | uimsbf |
|             for(l=0;l<number_of_nodes;l++){ | | |
|                 node_tag | 16 | uimsbf |
|             } | | |
|         } | | |
|     } | | |
| } | | |

FIG. 22

| API | ARGUMENT | RETURN VALUE | FUNCTION |
|---|---|---|---|
| getContractStatus | NONE | 0 : NG (WITHOUT SUBSCRIPTION) | ACQUIRE INFORMATION ON WHETHER PAY SERVICE CURRENTLY TUNED IN TO CAN BE REPRODUCED. |
| | | 1 : OK (WITH SUBSCRIPTION) | |

FIG. 26

| DATA STRUCTURE | NUMBER OF BITS | DATA NOTATION | DESCRIPTION | OPERATION/ ASSUMED OPERATION OF RECEIVER |
|---|---|---|---|---|
| application_service_descriptor () { | | | | |
|   descriptor_tag | 16 | uimsbf | | |
|   descriptor_length | 8 | uimsbf | | |
|   application_format_map | 8 | bslbf | INDICATE SCHEME APPLIED TO APPLICATION SERVICE IN BIT MAP. | FIXED OPERATION OF "0x01" WITH BIT 0 ASSIGNED TO HTML 5. RECEPTION APPARATUS THAT SUPPORTS ONLY HTML 5 CONFIRMS ONLY THAT BIT 0 = '1' AND NEGLECTS OTHER BITS. |
|   default_AIT_flag | 1 | bslbf | FLAG INDICATING WHETHER DEFAULT AIT TO BE MONITORED. | OPERATE IN ACCORDANCE WITH STANDARD. "0" IS SET IN A CASE WHERE AIT IS TRANSMITTED BY COMMUNICATION. "1" IS SET IN A CASE WHERE AIT IS TRANSMITTED BY BROADCASTING. |
|   DT_message_flag | 1 | bslbf | FLAG INDICATING PRESENCE OF DISTRIBUTION OF DATA TRANSMISSION MESSAGE. | OPERATE IN ACCORDANCE WITH STANDARD. "1" IS SET IN A CASE WHERE APPLICATION DATA IS TRANSMITTED BY BROADCASTING. |
|   reserved_future_use | 2 | bslbf | | |
|   EMT_num | 4 | bslbf | INDICATE NUMBER OF EMT DISTRIBUTIONS. | OPERATE IN ACCORDANCE WITH STANDARD. MAXIMUM NUMBER IS "8". |
|   AIT_location_info () { | | | INDICATE WHERE TO ACQUIRE AIT. | |
|     MMT_general_location_info() | N | | | location_type = "0" FOR TRANSMISSION BY BROADCASTING. location_type = "5" FOR TRANSMISSION BY COMMUNICATION. |
|   } | | | | |
|   if (DT_message_flag==1) { | | | | |
|     DT_message_location_info() { | | | INDICATE WHERE TO ACQUIRE DATA TRANSMISSION MESSAGE. | |
|       MMT_general_location_info() | N | | | location_type = "0" FOR TRANSMISSION BY BROADCASTING. |
|     } | | | | |
|   } | | | | |
|   for (j=0; j<EMT_num; j++) { | | | | |
|     EMT_location_info() { | | | INDICATE WHERE TO ACQUIRE EMT. IN A CASE WHERE MULTIPLE EMTS EXIST, MULTIPLE LOCATIONS CAN BE DESCRIBED. | |
|       MMT_general_location_info() | N | | | location_type = "0" FOR TRANSMISSION BY BROADCASTING. |
|     } | | | | |
|   } | | | | |
| } | | | | |

FIG. 27

| DATA STRUCTURE | NUMBER OF BITS | DATA NOTATIONS |
|---|---|---|
| Access_Control_Descriptor () { | | |
|   descriptor_tag | 16 | uimsbf |
|   descriptor_length | 8 | uimsbf |
|   CA_system_ID | 16 | uimsbf |
|   MMT_general_location_info () | | |
|   private_data | 8xN | bslbf |
| } | | |

| | |
|---|---|
| data_segment_tag | 4(=0x1) |
| data_length | 4(=0x1) |
| app_initiative_flag | 1 |
| reserved_future_use | 7 |

RECEPTION APPARATUS, RECEPTION METHOD, TRANSMISSION APPARATUS, AND TRANSMISSION METHOD

TECHNICAL FIELD

The present technology relates to reception apparatuses, reception methods, transmission apparatuses, and transmission methods. In particular, the present technology relates to a reception apparatus, a reception method, a transmission apparatus, and a transmission method capable of doing a promotion for non-subscribers to pay broadcast services more flexibly.

BACKGROUND ART

In pay broadcast services, such as pay per view (PPV), promotion services introducing programs are provided, thereby inducing non-subscribers who watch the promotion services to make subscriptions to the pay broadcast services (for example, see Patent Document 1).

CITATION LIST

Patent Document

Patent Document 1: Japanese Patent Application Laid-Open No. 2007-318798

SUMMARY OF THE INVENTION

Problems to be Solved by the Invention

In that connection, in current digital broadcasting within Japan, in order to promote pay broadcast services, in a case where a non-subscriber tunes into a pay broadcast service, a display is made indicating that a subscription to the service has not been made, and a promotion service is provided after obtaining consent of the non-subscriber. This makes it possible to induce the non-subscriber to make a subscription to the pay broadcast service.

However, there has been a request for enabling promotions for non-subscribers to pay broadcast services more flexibly.

The present technology has been made in view of such circumstances, and is intended to make it possible to more flexibly do promotions for non-subscribers to pay broadcast services.

Solutions to Problems

A reception apparatus of a first aspect of the present technology includes: a reception unit that receives broadcast content provided as a pay broadcast service, the broadcast content being transmitted in a scrambled manner; an acquisition unit that acquires a subscription check application for checking presence of a subscription to the pay broadcast service depending on information indicating presence of the subscription check application, the information being included in control information including information regarding a structure of the broadcast content; and a control unit that controls an operation of the subscription check application.

The reception apparatus of the first aspect of the present technology may be an independent apparatus, and may be an internal block that constitutes one apparatus. In addition, a reception method of the first aspect of the present technology is a reception method corresponding to the reception apparatus of the first aspect of the present technology.

In the reception apparatus and the reception method of the first aspect of the present technology, broadcast content provided as a pay broadcast service is received, the broadcast content being transmitted in a scrambled manner. A subscription check application for checking presence of a subscription to the pay broadcast service is acquired depending on information indicating presence of the subscription check application, the information being included in control information including information regarding a structure of the broadcast content. Then, an operation of the subscription check application is controlled.

A transmission apparatus of a second aspect of the present technology includes: a generation unit that generates control information including information regarding a structure of broadcast content to be provided as a pay broadcast service, the control information including information indicating presence of a subscription check application for checking presence of a subscription to the pay broadcast service; and a transmission unit that transmits the control information to be transmitted in a non-scrambled manner together with the broadcast content to be transmitted in a scrambled manner.

The transmission apparatus of the second aspect of the present technology may be an independent apparatus, and may be an internal block that constitutes one apparatus. In addition, a transmission method of the second aspect of the present technology is a transmission method corresponding to the transmission apparatus of the second aspect of the present technology.

In the transmission apparatus and the transmission method of the second aspect of the present technology, control information is generated including information regarding a structure of broadcast content to be provided as a pay broadcast service, the control information including information indicating presence of a subscription check application for checking presence of a subscription to the pay broadcast service. Then, the control information is transmitted in a non-scrambled manner together with the broadcast content that is transmitted in a scrambled manner.

Effects of the Invention

According to the first and second aspects of the present technology, a promotion for a non-subscriber to the pay broadcast service can be done more flexibly.

Note that effects described here are not necessarily restrictive, and may be either of effects described in the present disclosure.

BRIEF DESCRIPTION OF DRAWINGS

FIG. 9 is a diagram illustrating a structure of a PA message.

FIG. 10 is a diagram illustrating a structure of an M2 section message.

FIG. 11 is a diagram illustrating a structure of MPT.

FIG. 12 is a diagram illustrating a structure of location information.

FIG. 14 is a diagram illustrating a structure of a data directory management table.

FIG. 15 is a diagram illustrating a structure of a data asset management table.

FIG. 16 is a diagram illustrating a structure of a data content management table.

FIG. 22 is a diagram illustrating an exemplary subscription check API.

FIG. 26 is a diagram illustrating exemplary syntax of an application service descriptor.

FIG. 27 is a diagram illustrating exemplary syntax of an access control descriptor.

MODE FOR CARRYING OUT THE INVENTION

Figure 1:
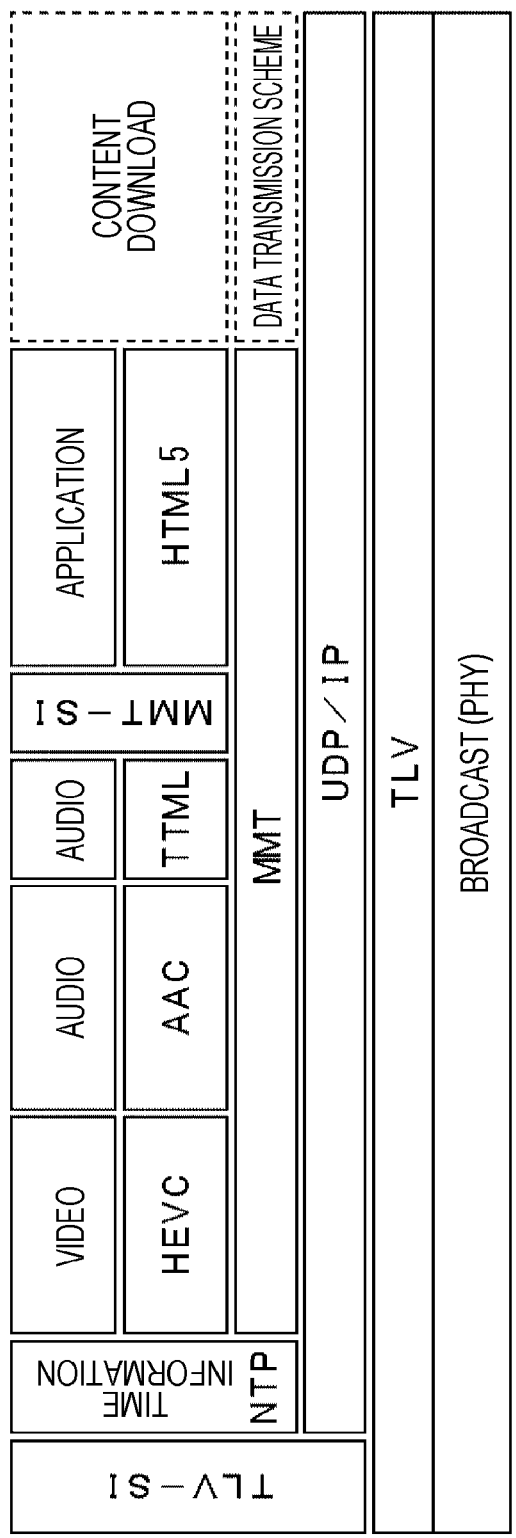
FIG. 1 is a diagram illustrating a protocol stack of a broadcasting system that employs an MMT scheme.

An embodiment of the present technology will be described below with reference to the drawings. Note that the description will be made in the following order.
1. Outline of MMT scheme
2. Configuration of system
3. Exemplary operation
4. Exemplary syntax
5. Configuration of each apparatus
6. Process flow to be executed by each apparatus
7. Variation
8. Configuration of computer
<1. Outline of MMT Scheme>

While a media transport scheme widely used in current broadcasting systems is a moving picture experts group-2 transport stream (MPEG2-TS) scheme, an MPEG media transport (MMT) scheme has been prescribed as a media transport scheme assuming introduction of a coordinated service of broadcasting and communication. Note that details of the MMT-based media transport scheme are described in the following Non-Patent Document 1.

Non-Patent Document 1: ARIB STD-B60 Version 1.1 Association of Radio Industries and Businesses (Protocol Stack)

FIG. 1 is a diagram illustrating a protocol stack of a broadcasting system that employs the MMT scheme.

In the protocol stack of FIG. 1, the lowest layer is the physical layer (PHY). In the MMT scheme, while some data may be transmitted not only via broadcasting but also via communication, in a case where data is transmitted via broadcasting, a frequency band allocated to each physical channel corresponds to the physical layer.

Upper layers of the physical layer are a type length value (TLV) layer and a user datagram protocol/Internet protocol (UDP/IP) layer. In addition, the MMT scheme is employed as a media transport layer for providing a function of converting components that constitute broadcast content, such as video and audio, into a format suitable for transmission or use.

In the MMT scheme, video data encoded by high efficiency video coding (HEVC) and audio data encoded by advanced audio coding (AAC) are in a media fragment unit/media processing unit (MFU/MPU) format, loaded on an MMT protocol (MMTP) payload, converted into an MMTP packet, and then transmitted in an IP packet.

In addition, data of subtitles and applications related to broadcast content is also in the MFU/MPU format, loaded on an MMTP payload, converted into an MMTP packet, and then transmitted in an IP packet. Note that subtitles are described in a timed text markup language (TTML) format. In addition, applications are described in a hypertext markup language 5 (HTML 5) format.

IP packets configured in this way are transmitted in a TLV packet format. Here, one IP packet or an IP packet obtained by compressing one header is transmitted as one TLV packet. In addition to these pieces of media data, control information is transmitted.

The control information includes TLV-SI regarding a TLV multiplexing scheme for multiplexing an IP packet and MMT-SI regarding MMT, which is a media transport scheme. That is, the TLV-SI is control information regarding multiplexing of an IP packet, and provides information for tuning and correspondence information between a service and an IP address. In addition, the MMT-SI is control information indicating a structure of broadcast content and the like. The MMT-SI is in an MMT control message format, loaded on an MMTP payload, converted into an MMTP packet, and then transmitted in an IP packet.

In addition, in a broadcasting system, a network time protocol (NTP) is transmitted as time information for providing absolute time.

(Structure of TLV Packet)

Figure 2:
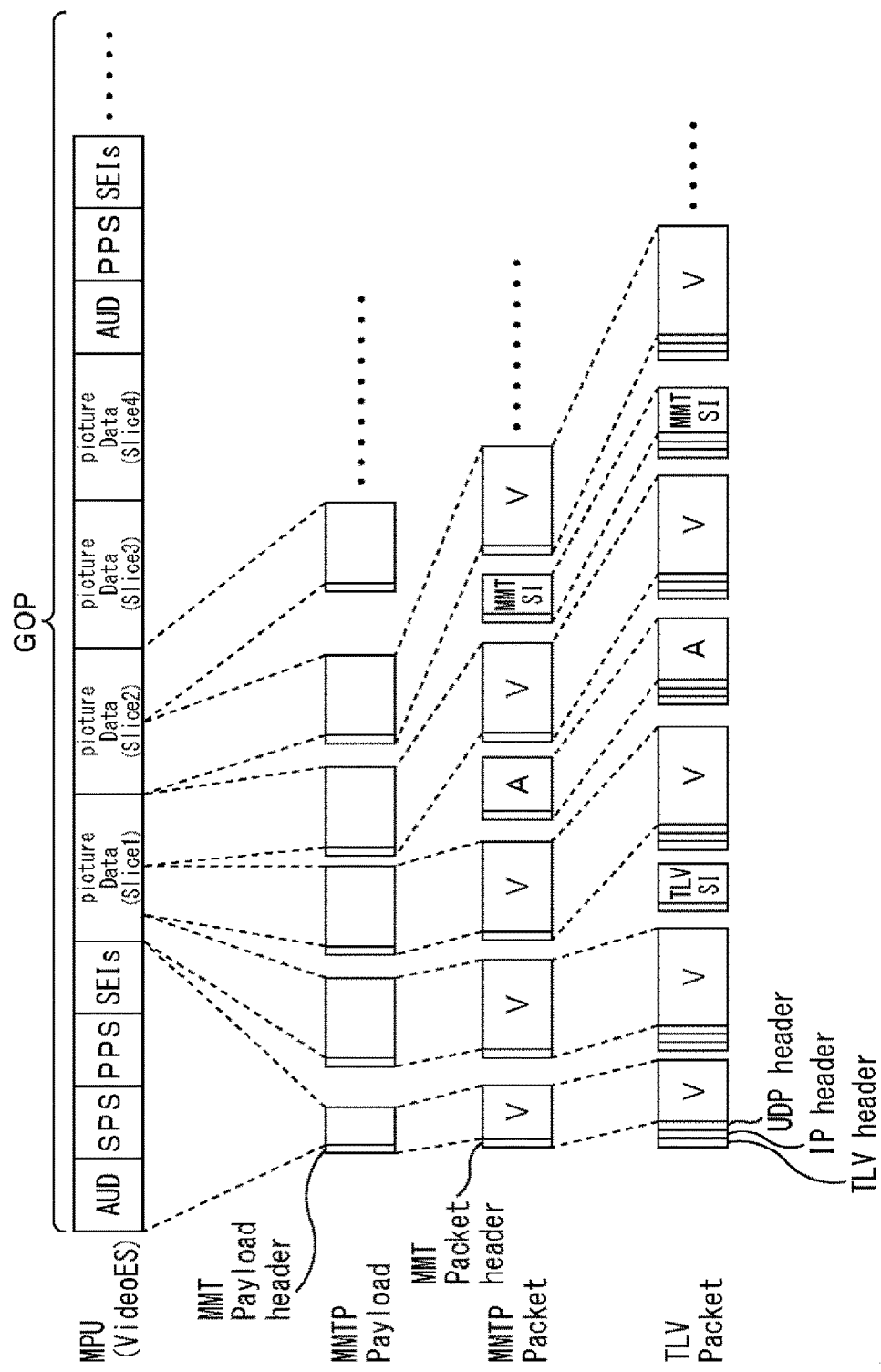
FIG. 2 is a diagram illustrating a structure of a TLV packet that transmits timed media data.

FIG. 2 is a diagram illustrating a structure of a TLV packet that transmits timed media data, such as video and audio, out of media data.

In FIG. 2, the MPU is a unit of processing in processing of timed media data, such as video and audio. The MPU includes one or more access units, and is a unit in which decoding processing of video and audio can be performed in the MPU alone. A size of the MPU is arbitrary, and in video data (video ES) in which encoding is performed using inter-frame prediction, the MPU needs to be in a unit of a group of picture (GOP). In addition, in the MPU, the MFU can be configured in units of a network abstraction layer (NAL) or an access unit.

The MPU and the MFU in a unit of GOP constitute the MMTP payload. In FIG. 2, control information that constitutes the GOP, such as access unit delimiter (AUD), sequence parameter set (SPS), picture parameter set (PPS), and supplemental enhancement information (SEIs), constitutes one MMTP payload. In addition, slices constituting each picture and constituting a GOP are extracted in accordance with a predetermined data size, thereby constituting a plurality of MMTP payloads. An MMT payload header is added to a head of each MMTP payload.

Figure 4:
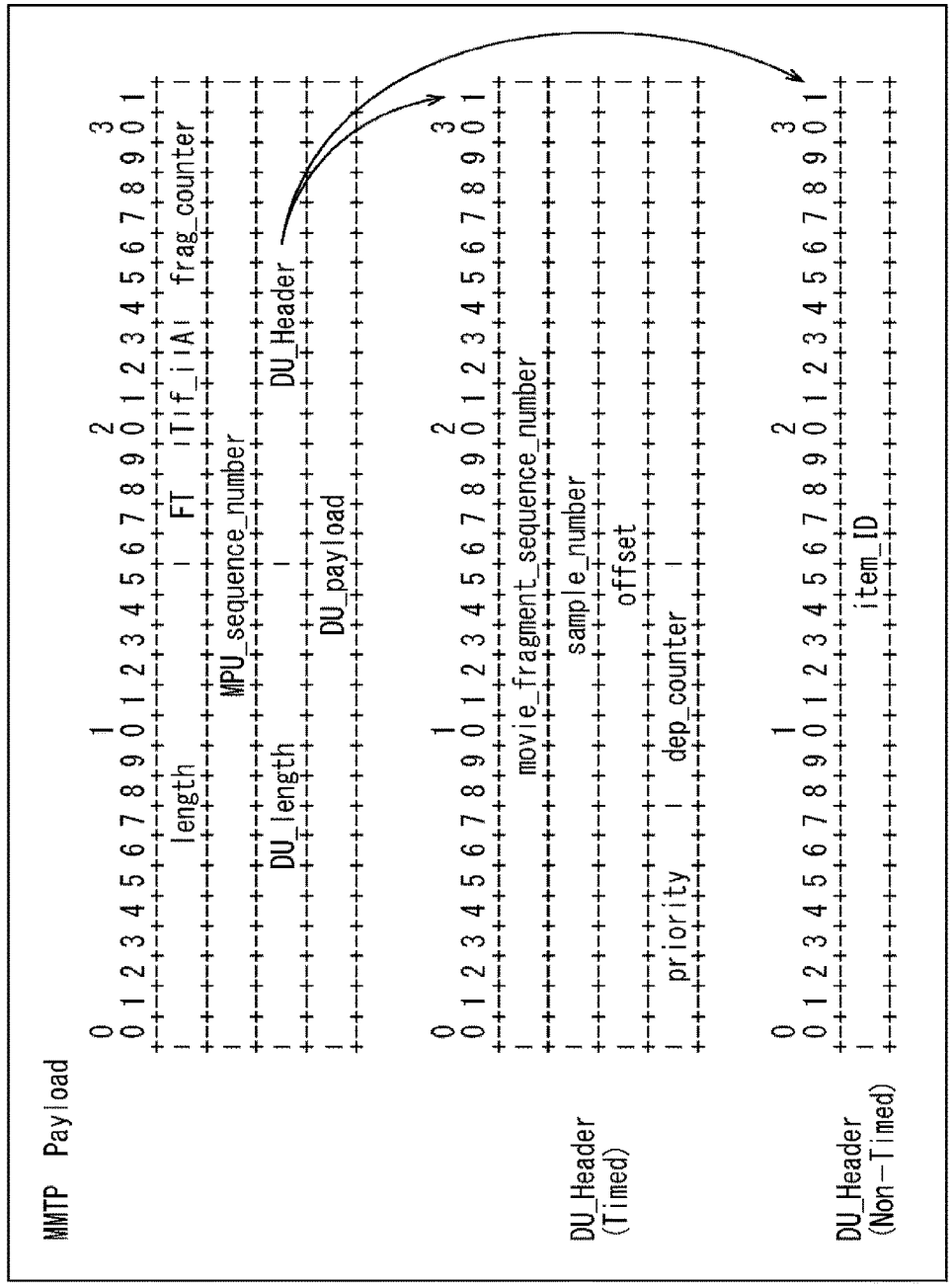
FIG. 4 is a diagram illustrating a structure of an MMTP payload.
Figure 5:
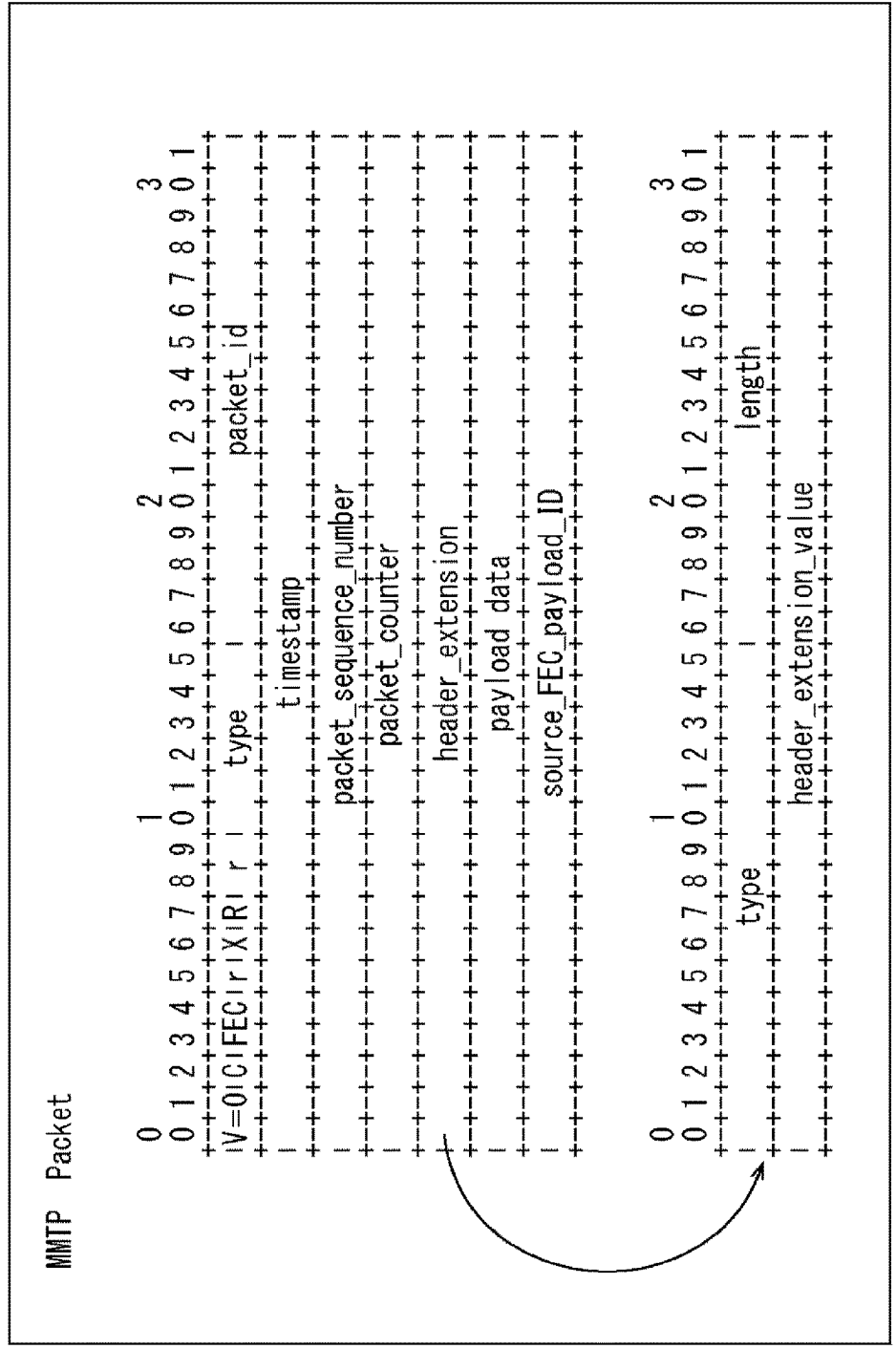
FIG. 5 is a diagram illustrating a structure of an MMTP packet.

The MMTP payload is transmitted in one MMTP packet. An MMT packet header is added to a head of each MMTP packet. Here, as the MMTP payload, the MMT-SI as control information is placed in addition to data of video or audio. In FIG. 2, "V" represents video and "A" represents audio. Note that FIG. 4 illustrates detailed structure of the MMTP payload. In addition, FIG. 5 illustrates detailed structure of the MMTP packet.

The MMTP packet is transmitted in one TLV packet. As the TLV packet, a TLV packet in which the TLV-SI as control information is placed is generated, in addition to the TLV packet in which video, audio, and MMT-SI are placed. Then, while a TLV header, an IP header, and a UDP header are added to a head of the former TLV packet, only a TLV header is added to a head of the latter TLV packet.

The TLV packet generated in this way is transmitted after transmission channel encoding, modulation, and the like are performed.

Figure 3:
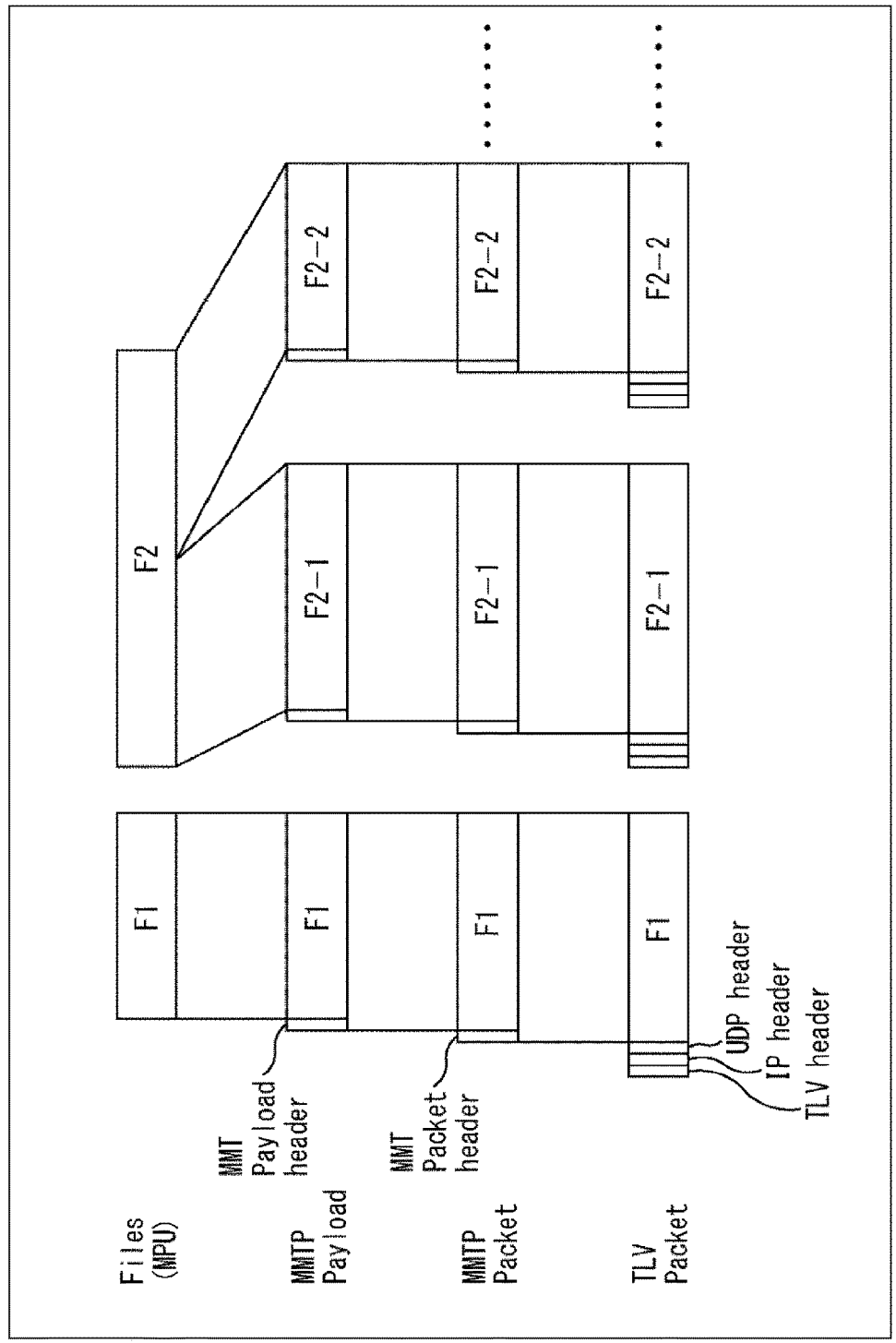
FIG. 3 is a diagram illustrating a structure of a TLV packet that transmits non-timed media data.

FIG. 3 is a diagram illustrating a structure of a TLV packet that transmits non-timed media data, such as a file format application, out of media data.

In FIG. 3, in processing of non-timed media data such as a file format application, each file corresponds to an MPU. That is, the MPU is in a file unit. In addition, in the MPU, an MFU, which is a unit smaller than the MPU, can be configured.

The MPU or the MFU constitutes an MMT payload. In FIG. 3, a file F1 constitutes one MMTP payload. In addition, a file F2 is divided into files F2-1 and F2-2 in accordance with a predetermined data size, and the divided files F2-1 and F2-2 constitute two MMTP payloads. An MMT payload header is added to a head of each MMTP payload.

The MMTP payload is transmitted in one MMTP packet. An MMT packet header is added to a head of each MMTP packet. Note that FIG. 4 illustrates a structure of the MMTP payload. In addition, FIG. 5 illustrates a structure of the MMTP packet.

The MMTP packet is transmitted in one TLV packet. A TLV header, an IP header, and a UDP header are added to a head of the TLV packet in which the file is placed.

The TLV packet generated in this way is multiplexed with the TLV packet in which video data, audio data, control information and the like are placed. The TLV packet is then transmitted after transmission channel encoding, modulation, and the like are performed.

(Structure of TLV-SI)

Figure 6:
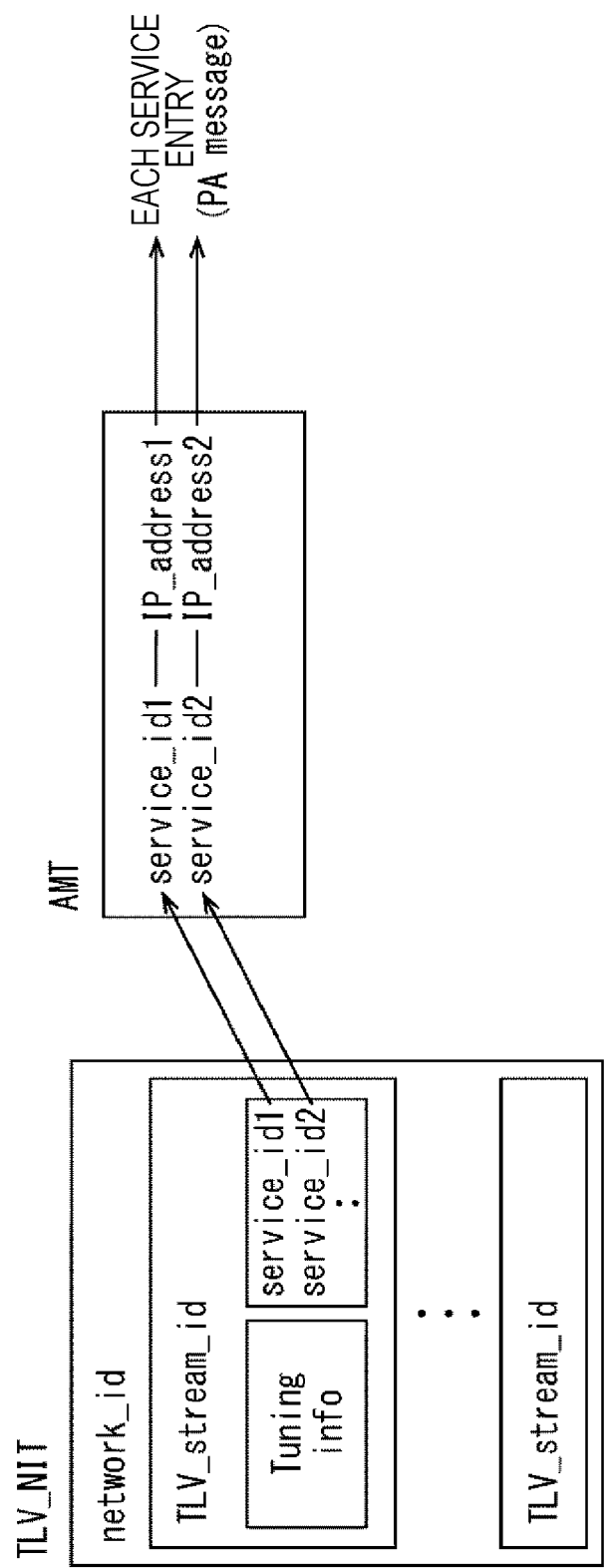
FIG. 6 is a diagram illustrating a structure of TLV-SI.

FIG. 6 is a diagram illustrating a structure of TLV-SI.

As illustrated in FIG. 6, a TLV-network information table (TLV-NIT) and an address map table (AMT) are prescribed as TLV-SI tables.

Figure 7:
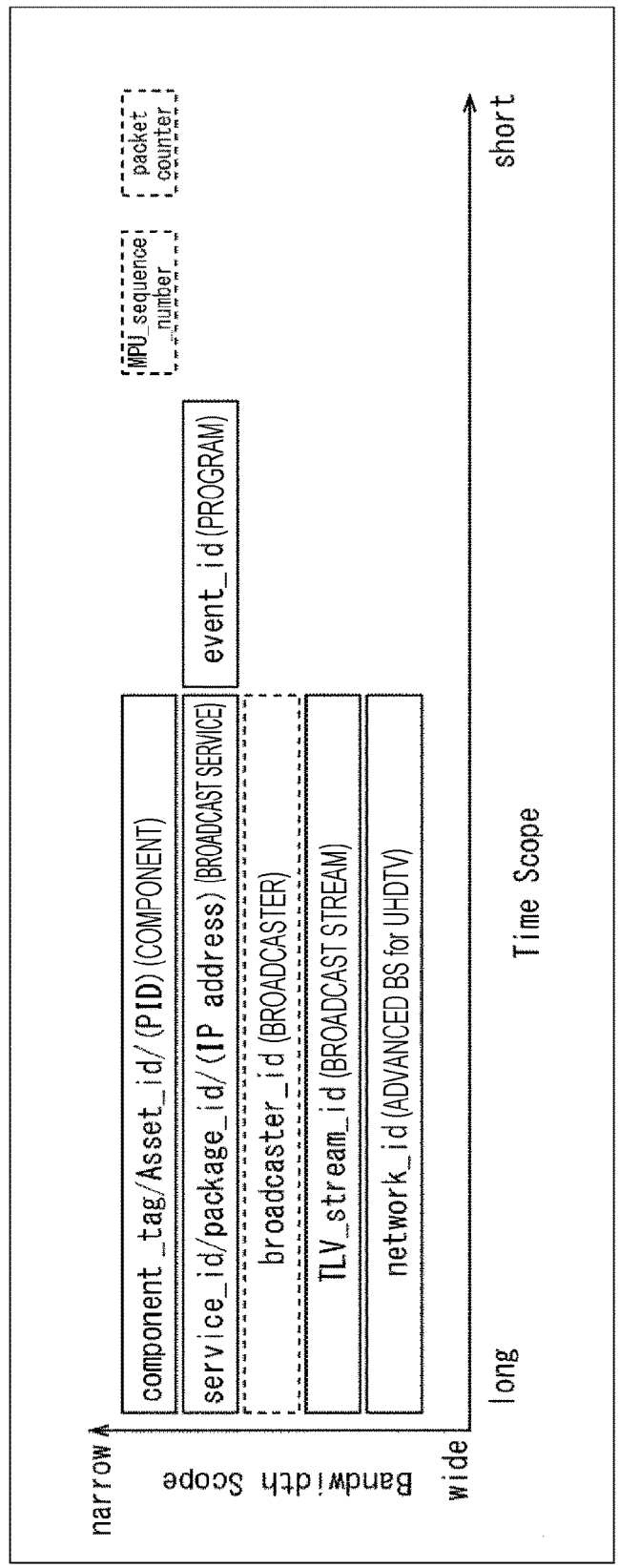
FIG. 7 is a diagram illustrating an ID system of the broadcasting system that employs the MMT scheme.

The TLV-NIT includes information regarding a transmission channel, such as a modulation frequency, and information for associating services in transmission in a TLV packet. In the TLV-NIT, a TLV stream loop is placed for a network ID (network_id). Each TLV stream loop is identified with a TLV stream ID (TLV_stream_id). Tuning information and a service ID (service_id) are placed in each TLV stream loop. Note that FIG. 7 illustrates an ID system such as the network ID, the TLV stream ID, and the service ID.

The AMT includes correspondence information (mapping information) for associating the service ID for identifying each service with an IP address. This correspondence information associates the service ID placed in the TLV stream loop of the TLV-NIT with the IP address, enabling connection to each service entry such as a PA message.

(Structure of MMT-SI)

Figure 8:
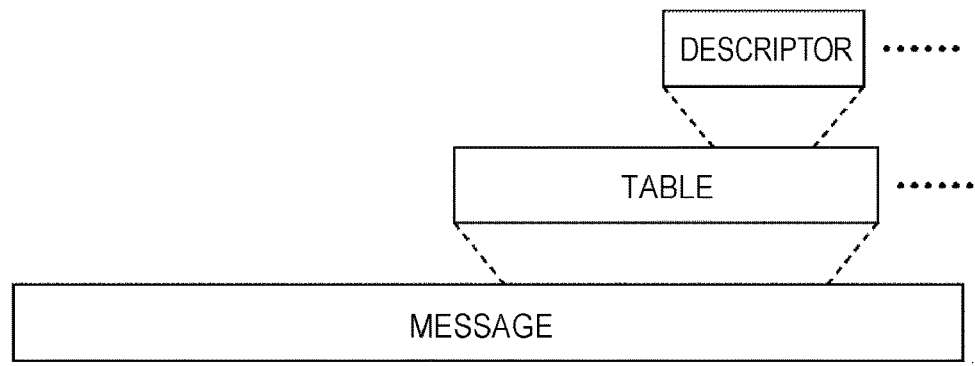
FIG. 8 is a diagram illustrating a structure of MMT-SI.

FIG. 8 is a diagram illustrating a structure of MMT-SI.

As illustrated in FIG. 8, the MMT-SI includes three layers: a message storing a table and a descriptor, a table having elements and attributes indicating specified information, and a descriptor describing more detailed information.

The message can store one or more tables depending on a type of message. The message is stored in an MMTP payload and transmitted using an MMTP packet. The message includes a PA message, an M2 section message, a CA message, and an M2 short section message.

The PA message is used for transmitting various tables. As the PA message, for example, an MMT package table (MPT), a package list table (PLT), and a layout configuration table (LCT) are placed. Note that FIG. 9 illustrates a structure of the PA message.

The M2 section message is used for transmitting a section extended format of an MPEG 2 system. Note that FIG. 10 illustrates a structure of the M2 section message. The CA message is used for transmitting a table to be used for identification of a conditional access system (CAS). The M2 short section message is used for transmitting a section short format of the MPEG 2 system.

(Structure of MPT)

The MPT includes information that constitutes a package such as an asset list and a position of the asset on a network. Various tables can be placed in the MPT. Note that FIG. 11 illustrates a structure of the MPT. In addition, FIG. 12 illustrates a structure of location information corresponding to MMT_general_location_info( ) of the MPT of FIG. 11. Note that the MPT is called an MP table in some cases.

(Transmission of Application)

Figure 13:
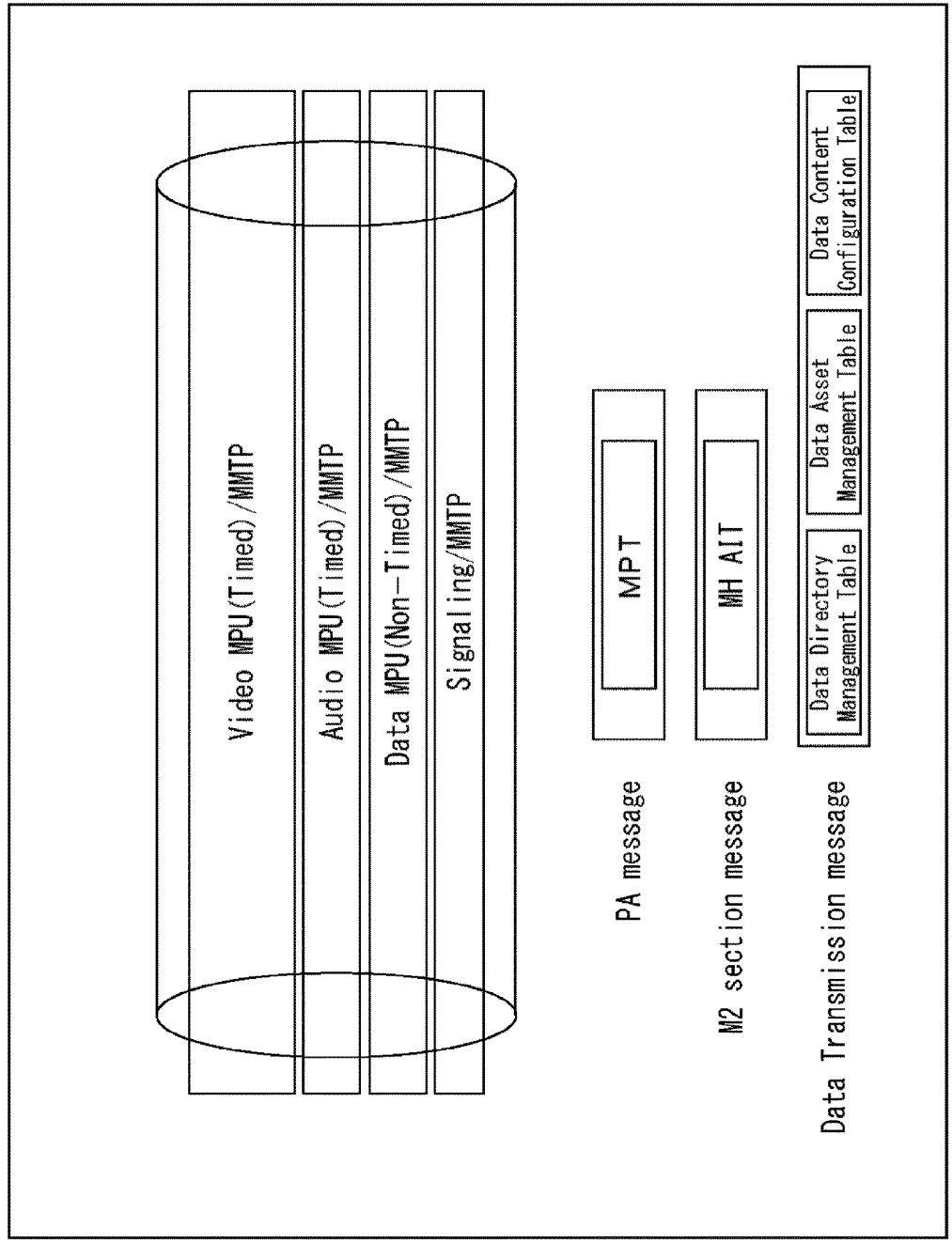
FIG. 13 is a diagram illustrating a structure of data transmission related information.

FIG. 13 is a diagram illustrating a structure of data transmission related information.

In FIG. 13, in a broadcast stream, streams of timed media data such as video and audio, and streams of non-timed media data such as data (data broadcasting) are transmitted. Note that an application is transmitted in the stream of data (data broadcasting).

In addition, a stream of control information (signaling) is transmitted in the broadcast stream. For example, the PA message, the M2 section message, a data transmission message (DT-Mes) and the like are transmitted in this stream of control information.

In the PA message, the MPT and the like are stored. In addition, in the M2 section message, an MH-application information table (MH-AIT) and the like are stored. The MH-AIT includes all information on the application and information such as an initiation state requested to the application.

The data transmission message (DT-Mes) is a message that stores a table regarding data transmission. In the data transmission message, a data directory management table (DDMT), a data asset management table (DAMT), and a data content configuration table (DCCT) are stored.

The data directory management table (DDMT) provides a directory structure of files that constitute the application for separating an application file structure and a structure for file transmission. Note that FIG. 14 illustrates a structure of the data directory management table (DDMT).

The data asset management table (DAMT) provides a structure of the MPU within an asset and a version of each MPU. Note that FIG. 15 illustrates a structure of the data asset management table (DAMT).

The data content configuration table (DCCT) provides file structure information as data content for implementing flexible and effective cache control. The data content configuration table indicates which file or directory is related and linked to which presentation unit in a presentation unit (PU) within the data content. Note that FIG. 16 illustrates a structure of the data content configuration table (DCCT).

Figure 17:
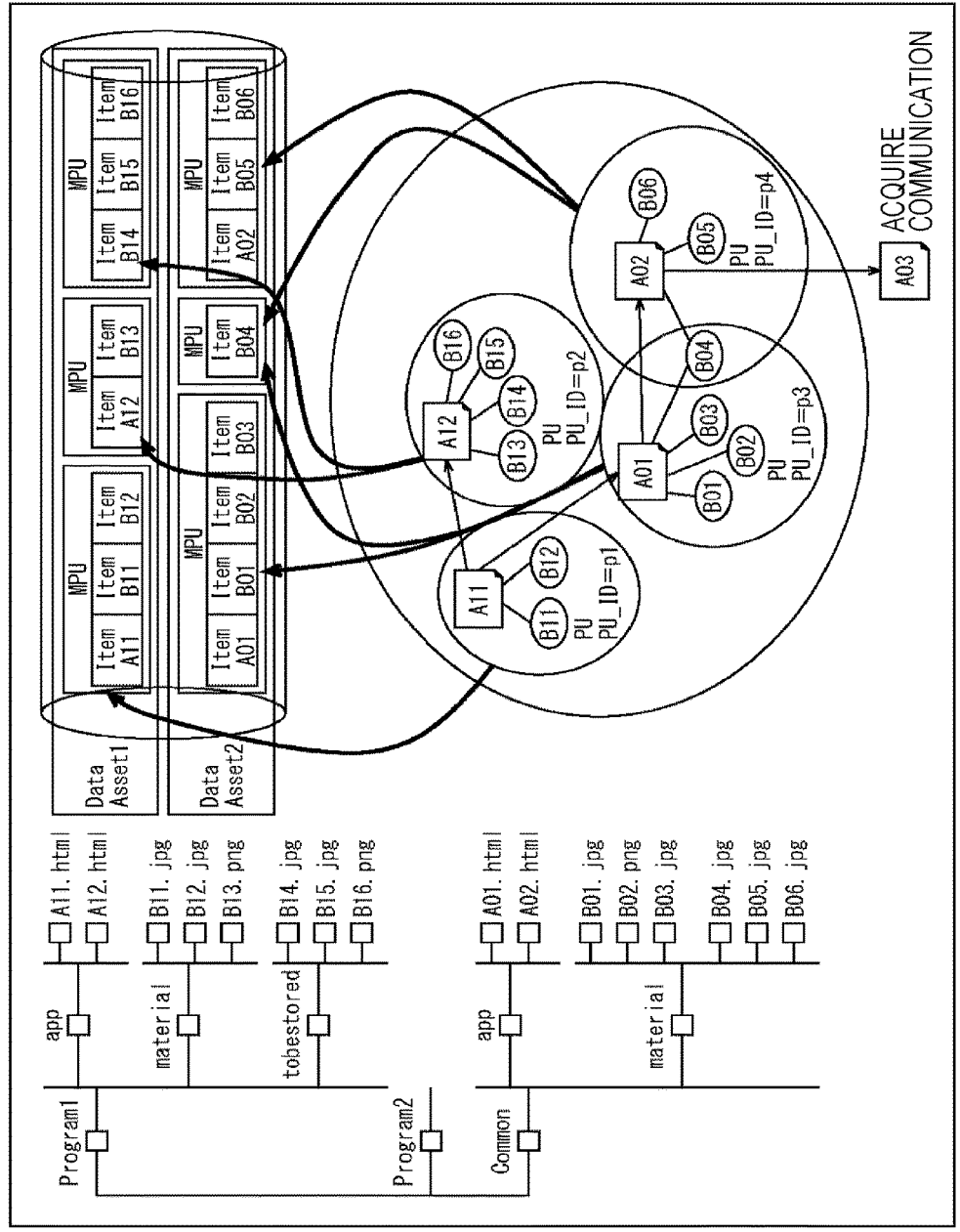
FIG. 17 is a diagram illustrating a specific example of application transmission.

FIG. 17 illustrates a specific example of application transmission managed by the data directory management table (DDMT), the data asset management table (DAMT), and the data content configuration table (DCCT).

In FIG. 17, in accordance with the MMT scheme, HTML files, image files, and the like that constitute an application of an HTML 5 format shown in a directory structure are transmitted as items on an MPU-by-MPU basis for each data asset. For example, in a case where an application is initiated or an application transitions to another application, an HTML file, an image file, and the like that constitute the current application are acquired. Note that the application may be acquired from a server 30 over an Internet 90 in some cases.

<2. Configuration of System>

Figure 18:
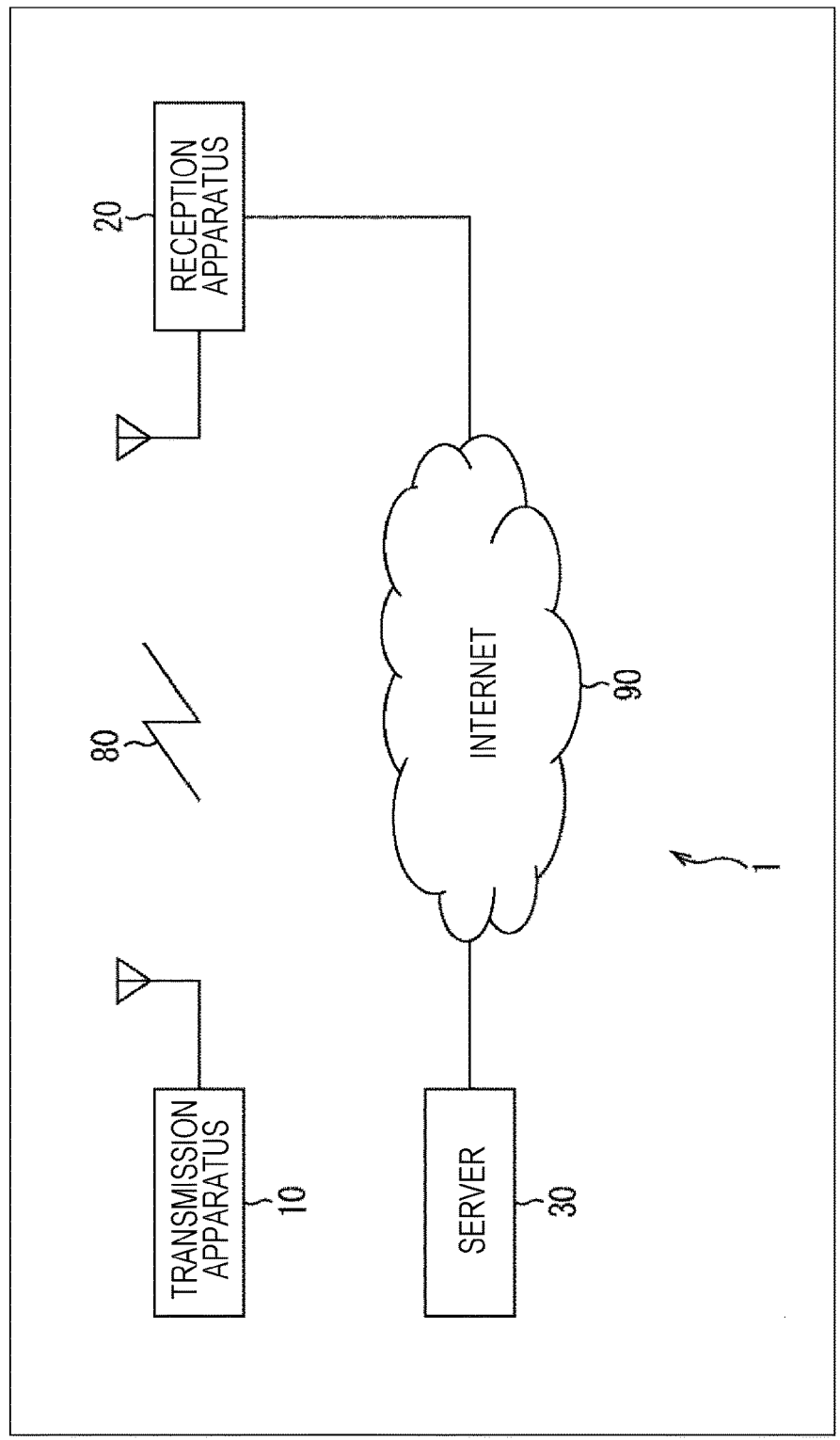
FIG. 18 is a diagram illustrating a configuration of one embodiment of a broadcast communication system to which the present technology is applied.

FIG. 18 is a diagram illustrating a configuration of one embodiment of a broadcast communication system to which the present technology is applied.

In FIG. 18, a broadcast communication system 1 includes a transmission apparatus 10, a reception apparatus 20, and the server 30. In addition, in FIG. 18, the reception apparatus and the server 30 are connected to each other over the Internet 90.

The transmission apparatus 10 transmits broadcast content (hereinafter referred to as pay content) provided as a pay broadcast service (pay service), such as PPV, via a transmission channel 80 in a digital broadcast signal compatible with the MMT scheme. In addition, the transmission apparatus 10 can distribute applications that operate in relation to the pay content (hereinafter referred to as pay related applications) by data broadcasting.

In addition, the transmission apparatus 10 transmits, to the reception apparatus 20, an entitlement management message (EMM) as related information on an identification unit of the reception apparatus 20 (individual messages), and an entitlement control message (ECM) as related information common to each reception apparatus 20 (common message).

The EMM includes an encrypted part and a non-encrypted part. In the EMM, for example, the encrypted part is encrypted using a device key (Kd), and a work key (Kw) or the like is placed therein. In addition, the ECM includes an encrypted part and a non-encrypted part. In the ECM, for example, the encrypted part is encrypted using a work key (Kw), and a scramble key (Ks) or the like is placed therein.

Note that the pay content may be, for example, super-high-definition content, so-called 4K or 8K. In addition, the pay content is transmitted in a scrambled (encrypted) manner using the scramble key (Ks).

In addition, examples of the pay related application include a subscription check application (entry application) for checking presence of a subscription to a pay service, a promotion application for introducing the pay content (pay service), and a conjunction application (program related application) to be executed in conjunction with descrambled pay content.

The reception apparatus 20 is, for example, a television receiver capable of receiving a digital broadcast signal compatible with the MMT scheme. The reception apparatus 20 is placed at home of a user. In a case where the user has a subscription to a pay service, the reception apparatus 20 can receive a digital broadcast signal transmitted from the transmission apparatus 10 via the transmission channel 80 and reproduce pay content. In addition, the reception apparatus 20 can receive and execute a pay related application distributed by data broadcasting via the transmission channel 80 from the transmission apparatus 10.

In addition, since the EMM and the ECM transmitted from the transmission apparatus 10 are acquired in the reception apparatus 20, the work key (Kw) is acquired by decoding the EMM by using the device key (Kd). In addition, the scramble key (Ks) is acquired by decoding the ECM by using the work key (Kw). The reception apparatus 20 can descramble the pay content by using this scramble key (Ks).

The server 30 performs various processes in response to a request from the reception apparatus 20 over the Internet 90. For example, the server 30 can distribute the pay related application over the Internet 90 in response to the request from the reception apparatus 20. In this case, the reception apparatus 20 receives and executes the pay related application distributed from the server 30 over the Internet 90.

In addition, for example, the server 30 can perform a process for licensing, billing, and payment for the pay service such as PPV (pay content). In this case, the server 30 distributes the license for the pay service in response to the request from the reception apparatus 20. In addition, the server 30 performs the billing and payment process for the pay content of which purchase is instructed in response to the request from the reception apparatus 20.

Note that in FIG. 18, for convenience of description, it has been described that the server 30 performs all processes such as an application distribution process, a license distribution process for the pay service, and the billing and payment process; however, the server may be divided into servers for respective functions, for example, servers including an application server, a licensing server, and a billing and payment server may be provided separately.

In addition, FIG. 18 illustrates a case where one transmission apparatus 10 and one reception apparatus 20 are provided for convenience of description; however, for example, a plurality of transmission apparatuses 10 may be provided for respective broadcasters (pay service providers), and a plurality of reception apparatuses 20 may be provided for respective users.

(Process Flow of Reception Apparatus)

Figure 19:
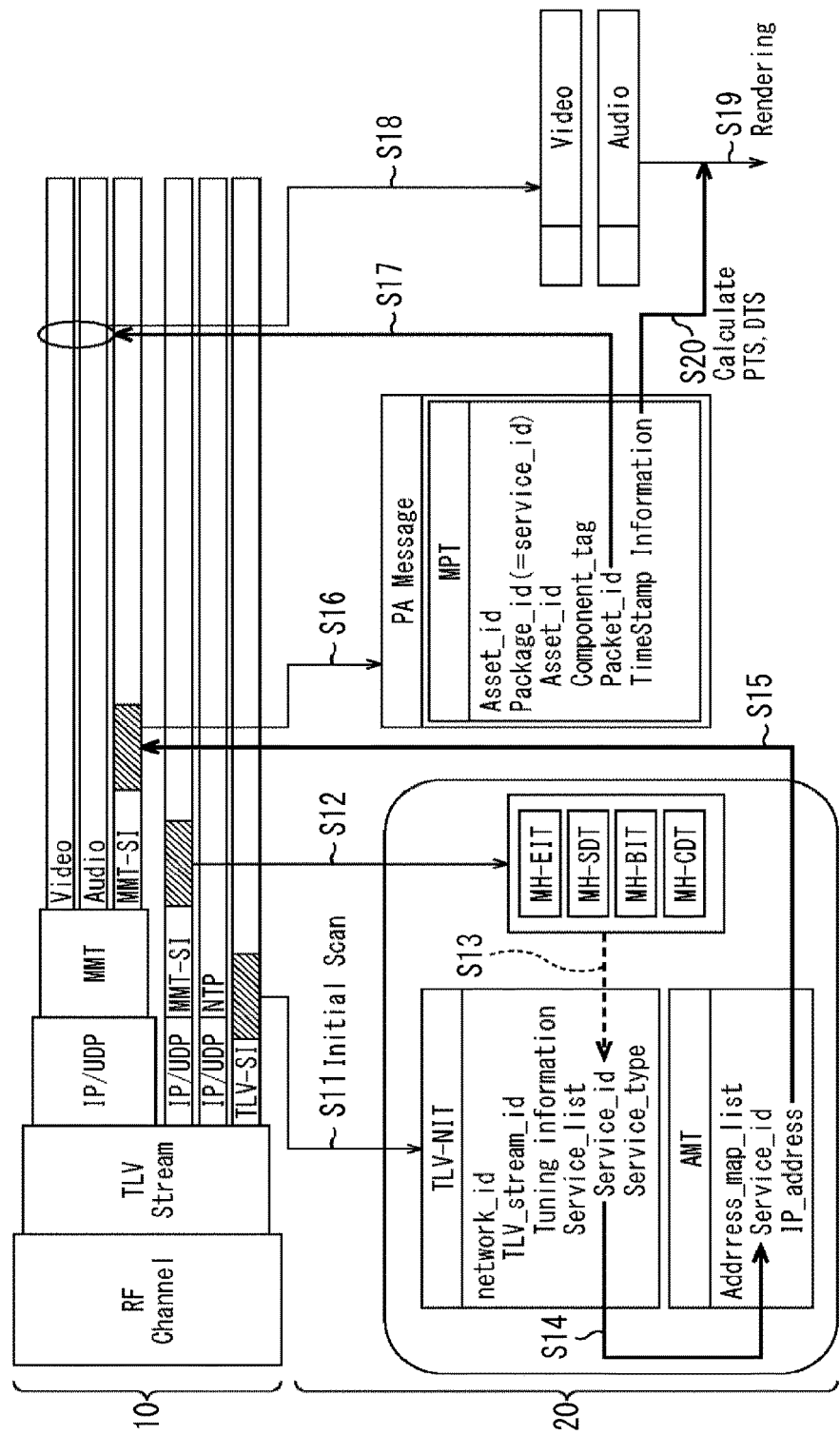
FIG. 19 is a sequence diagram illustrating a specific process flow in a reception apparatus.

FIG. 19 is a sequence diagram illustrating a specific process flow in the reception apparatus 20 that receives the digital broadcast signal transmitted from the transmission apparatus 10.

Note that in FIG. 19, an upper part of the diagram represents a data flow transmitted from the transmission apparatus 10, and a lower part of the diagram represents a process flow in the reception apparatus 20 that processes such data. In addition, in FIG. 19, a direction of time is a direction from a left side to a right side in the diagram.

In FIG. 19, the transmission apparatus 10 transmits a broadcast wave of digital broadcasting (RF Channel) that employs the MMT scheme. In this broadcast wave, components that constitute pay content to be provided as a pay service and streams of control information, such as MMT-SI and TLV-SI, are transmitted in a TLV stream.

As illustrated in FIG. 19, in the reception apparatus 20, the TLV-NIT and the AMT are acquired from the TLV packet transmitted in the TLV stream by an initial scanning process or the like. The TLV-NIT and the AMT are then recorded in a memory such as NVRAM (S11).

Note that the reception apparatus 20 can acquire tables transmitted in the TLV stream, such as an MH event information table (MH-EIT), an MH service description table (MH-SDT), an MH broadcaster information table (MH-BIT), and an MH common data table (MH-CDT) (S12). These tables are associated with the TLV-NIT by the service ID (S13).

For example, in a case where a user performs a tuning operation of a service, the reception apparatus 20 reads tuning information (TLV-NIT, AMT) from a memory, and acquires the IP address corresponding to the service ID of the service that is tuned in to (S14). Then, the reception apparatus 20 can acquire the MMT-SI from the MMTP packet that is transmitted in the TLV stream in accordance with the IP address of the AMT (S15). Here, the MPT that is transmitted as the PA message is acquired (S16).

In the MPT, a packet ID for acquiring a component is set as location information in a case where the component stream is transmitted by broadcasting. The reception apparatus 20 can acquire video data and audio data by extracting the MMTP packet that is transmitted in the TLV stream in accordance with the packet ID that is set in the MPT location information (S17, S18).

Then, the reception apparatus 20 performs a buffering process by temporarily storing the video data and the audio data in a buffer, and by further performing a rendering process, the video and the audio of the pay content provided as the service that is tuned in to are output (reproduced). However, in order to reproduce the pay content in the reception apparatus 20, the user needs to have a subscription to the pay service.

Note that since time stamp information is placed in the MPT, decoding time (DTS: Decode Time Stamp) and presentation time (PTS: Presentation Time Stamp) can be calculated (S20).

<3. Exemplary Operation>

Next, a specific exemplary operation of the pay service to be provided by the broadcast communication system 1 of FIG. 18 will be described. Here, in order to make the description easier to understand, to begin with, a conventional promotion service will be described to determine problems thereof with reference to FIG. 20, and then a promotion service to which the present technology is applied will be described with reference to FIG. 21 to FIG. 25.

(Conventional Promotion Service)

Figure 20:
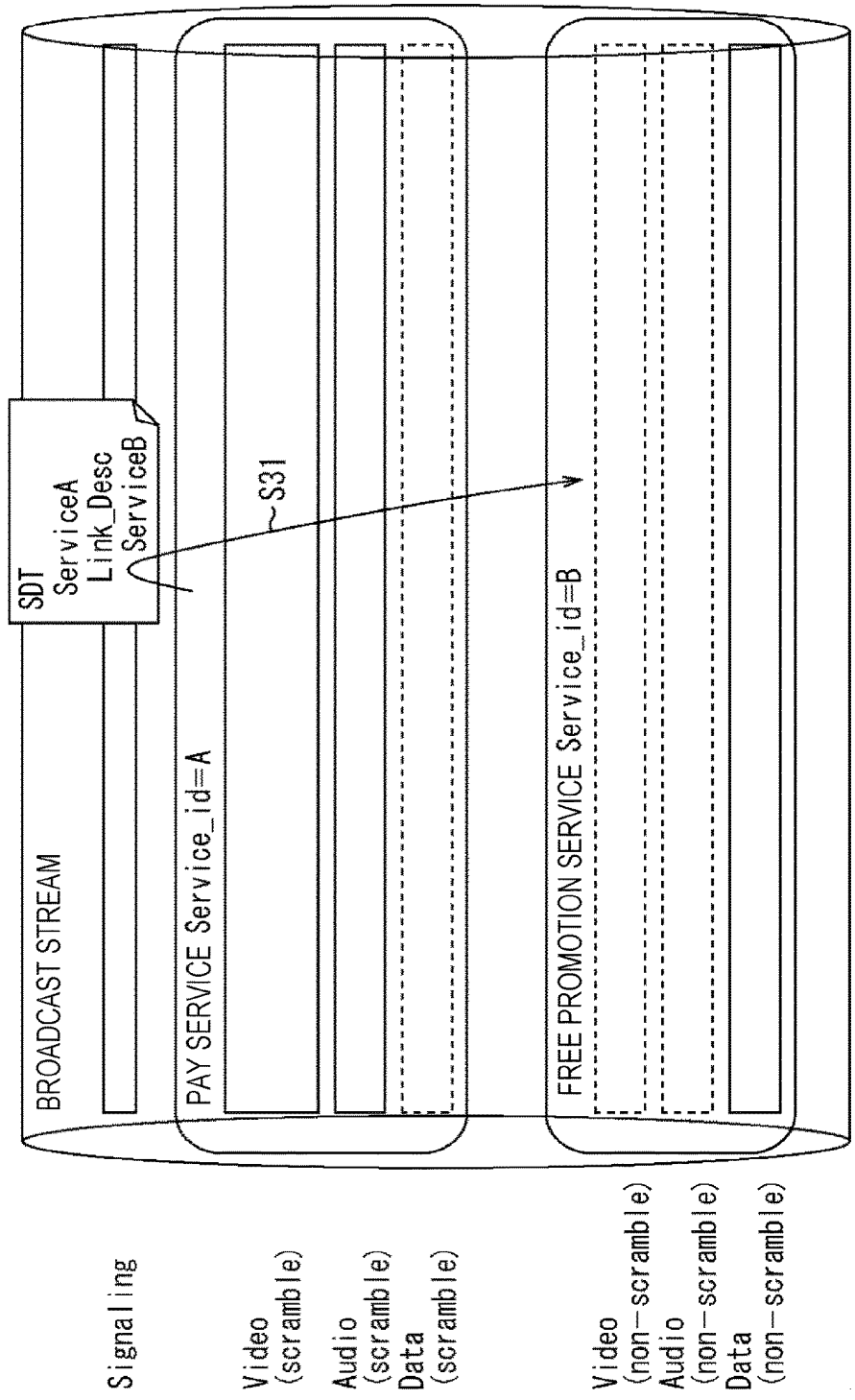
FIG. 20 is a diagram illustrating a conventional promotion service.

FIG. 20 is a diagram illustrating a conventional promotion service. FIG. 20 illustrates a broadcast stream transmitted from the transmission apparatus 10 to the reception apparatus 20, and the MPEG 2-TS scheme is used as the media transport scheme.

In FIG. 20, in the broadcast stream, a stream of a pay service to which a service ID of "A" is assigned and a stream of a free promotion service to which a service ID of "B" is assigned are transmitted. In addition, in the broadcast stream, a stream of control information (signaling) is transmitted including a service description table (SDT) in which information on a service level is described.

In addition, in FIG. 20, streams of video, audio, and data (data broadcasting) that serve as components that constitute the pay service are scrambled (encrypted). That is, these scrambled video, audio, and data constitute pay content, and only users who have a subscription to the pay service can view the pay content. However, as illustrated with a dotted line in the diagram, it is optional whether to transmit, for example, the stream of data (data broadcasting), such as an application, in the pay service.

On the other hand, streams of video, audio, and data (data broadcasting) that serve as components that constitute a free promotion service are non-scrambled (non-encrypted) streams. However, as illustrated with dotted lines in the diagram, it is optional whether to transmit the streams of video and audio in the free promotion service. That is, while only data streams are transmitted in a case where promotion by data broadcasting is performed, video and audio streams are transmitted in a case where video and audio for preview are provided.

Here, in the reception apparatus 20, in a case where a user who does not have a subscription to a pay service tunes in to the pay service, a message is displayed indicating that the subscription to the pay service has not been made, and a message urging switching to the free promotion service is displayed. Then, in a case where the non-subscribing user consents to switching to the free promotion service, the free promotion service is provided.

At this time, in the SDT transmitted as control information in the broadcast stream, a free promotion service to which the pay service is to be switched and a link descriptor (Link_Desc) for designating a message to be displayed during the switching are placed. Accordingly, the SDT including this link information is received in the reception apparatus 20.

Then, in the reception apparatus 20, a resident application displays a message urging switching to the free promotion service on the basis of the link information included in the SDT. In addition, in a case where the non-subscribing user consents to switching to the free promotion service, the resident application switches the current service from the pay service to the free promotion service (S31 of FIG. 20).

Accordingly, the reception apparatus 20 displays, for example, a message, video, or the like of the free promotion service by data broadcasting. Then, in a case where the non-subscribing user who views the promotion desires to view the pay service, for example, making telephone contact with a pay service provider and performing subscription procedures for the pay service allow the user to view the pay service.

As described above, the conventional promotion service can induce the non-subscribing user to the free promotion service, but display and switching processes to be performed by the resident application are special processes. Therefore, a manufacturer of the reception apparatus 20 makes a request that the reception apparatus 20 should induce the non-subscribing user to the free promotion service without performing such special processes.

In addition, in the conventional promotion service, since only switching is made from the pay service to the free promotion service when the non-subscribing user tunes in to the pay service, the pay service provider makes a request for providing the free promotion service with higher flexibility. Furthermore, it is necessary to prepare the pay service and the free promotion service as separate services, which may become operational constraints.

Therefore, next, promotion services to which the present technology that satisfies such a request is applied will be described, and here, separate descriptions will be provided about a promotion service in a case where the pay service provider provides a single service, and a promotion service in a case where the pay service provider provides a plurality of services.

(Promotion Service by Single Service)

To begin with, a promotion service in a case where the pay service provider provides a single service will be described with reference to FIGS. 21 to 23.

Figure 21:
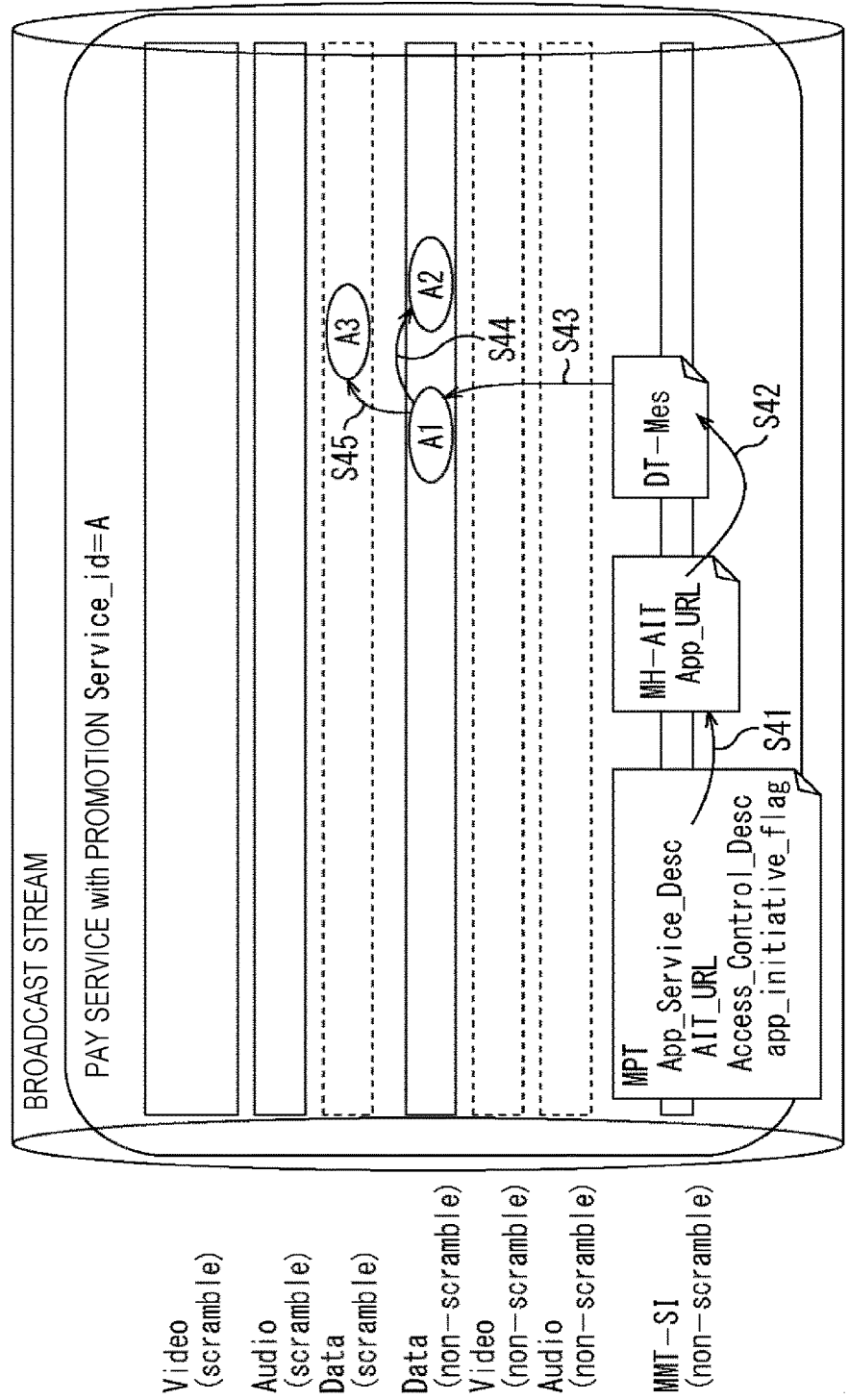
FIG. 21 is a diagram illustrating a promotion service to which the present technology is applied in a case where a single service is provided.

FIG. 21 is a diagram illustrating a promotion service to which the present technology is applied in a case where a single service is provided. FIG. 21 illustrates a broadcast stream to be transmitted from the transmission apparatus 10 to the reception apparatus 20, and the MMT scheme is used as the media transport scheme therefor.

In FIG. 21, streams of a pay service to which a service ID of "A" is assigned are transmitted in the broadcast stream. These streams of the pay service include streams of the promotion service.

That is, as components that constitute the pay service, the streams of the pay service include streams of scrambled (encrypted) video, audio, and data (data broadcasting), and streams of non-scrambled (non-encrypted) video, audio, and data (data broadcasting).

Then, the scrambled video, audio, and data constitute pay content, and only a user who has a subscription to the pay service can view the pay content. However, as illustrated with a dotted line in the diagram, it is optional whether to transmit, for example, the stream of data (data broadcasting), such as an application, out of the scrambled streams. In addition, the non-scrambled video, audio, and data are transmitted for providing the promotion service. However, as illustrated with dotted lines in the diagram, it is optional whether to transmit the streams of video and audio out of the non-scrambled streams.

In addition, the streams of the pay service include a stream of MMT-SI for transmitting control information for the pay service. The MMT-SI stream is a non-scrambled (non-encrypted) stream.

Here, in a case where the user tunes into the pay service in the reception apparatus 20, MPT transmitted as a PA message is acquired in the MMT-SI stream. In the MPT, an application service descriptor (App_Service_Desc) and an access control descriptor (Access_Control_Desc) are placed.

The application service descriptor is a descriptor for describing information regarding an application. The application service descriptor describes information indicating where to acquire an MH application information table (MH-AIT), and information indicating whether a data transmission message (DT-Mes) is transmitted, and the like.

Note that the application service descriptor is placed as necessary. In addition, a detailed structure of the application service descriptor will be described later with reference to syntax of FIG. 26.

The access control descriptor is a descriptor for describing information regarding a conditional access system (CAS). An application initiative flag (app_initiative_flag) is described in the access control descriptor. This application initiative flag is information indicating presence of the subscription check application. That is, with the application initiative flag, it is possible to recognize whether the promotion service to which the present technology is applied is supported by the pay related application transmitted in the non-scrambled data (data broadcasting).

Note that the access control descriptor is placed only in a case where the components that constitute the service are scrambled. In addition, a detailed structure of the access control descriptor will be described later with reference to syntax of FIG. 27.

In a case where the access control descriptor is placed in the MPT, the reception apparatus 20 checks the application initiative flag described in the access control descriptor. In a case where the application initiative flag indicates that the subscription check application exists, the reception apparatus 20 acquires the MH application information table (MH-AIT) transmitted as an M2 section message in the MMT-SI stream, in accordance with information (AIT_URL) that indicates where to acquire the MH application information table (MH-AIT) described in the application service descriptor (S41).

In addition, the reception apparatus 20 acquires management tables transmitted as the data transmission message (DT-Mes) in the MMT-SI stream, in accordance with an application URL (App_URL) described in the MH application information table (MH-AIT) (S42). Here, as the management tables, a data directory management table (DDMT), a data asset management table (DAMT), and a data content configuration table (DCCT) are acquired.

The reception apparatus 20 acquires a subscription check application A1 to be transmitted in the non-scrambled stream of data (data broadcasting), in accordance with the description of the management tables (DDMT, DAMT, DCCT) (S43). The subscription check application A1 can execute an API for acquiring information on whether the pay service that is currently tuned in to can be reproduced (hereinafter referred to as a subscription check application programming interface (API)).

As illustrated in FIG. 22, the subscription check API is defined as getContractStatus and returns "0" as a return value thereof in a case where the user does not have a subscription to the pay service that is tuned in to. The subscription check API returns "1" in a case where the user has a subscription to the pay service that is tuned in to. Therefore, the subscription check application A1 can determine whether the pay service that is tuned in to can be reproduced by executing the subscription check API.

Returning to the description of FIG. 21, in a case where the return value of the subscription check API executed by the subscription check application A1 is "0", that is, in a case where the subscription to the pay service has not been made, the reception apparatus 20 acquires a promotion application A2 transmitted in the stream of the non-scrambled data (data broadcasting) (S44). Accordingly, transition is made from the subscription check application A1 to the promotion application A2, and a message, video, and the like of the free promotion service is provided by the promotion application A2.

On the other hand, in a case where the return value of the subscription check API executed by the subscription check application A1 is "1", that is, in a case where the subscription to the pay service has been made, the reception apparatus 20 acquires a conjunction application transmitted in the stream of the scrambled data (data broadcasting) (S45). Accordingly, transition is made from the subscription check application A1 to the conjunction application A3, and the conjunction application A3 is executed in conjunction with the pay content.

Figure 23:
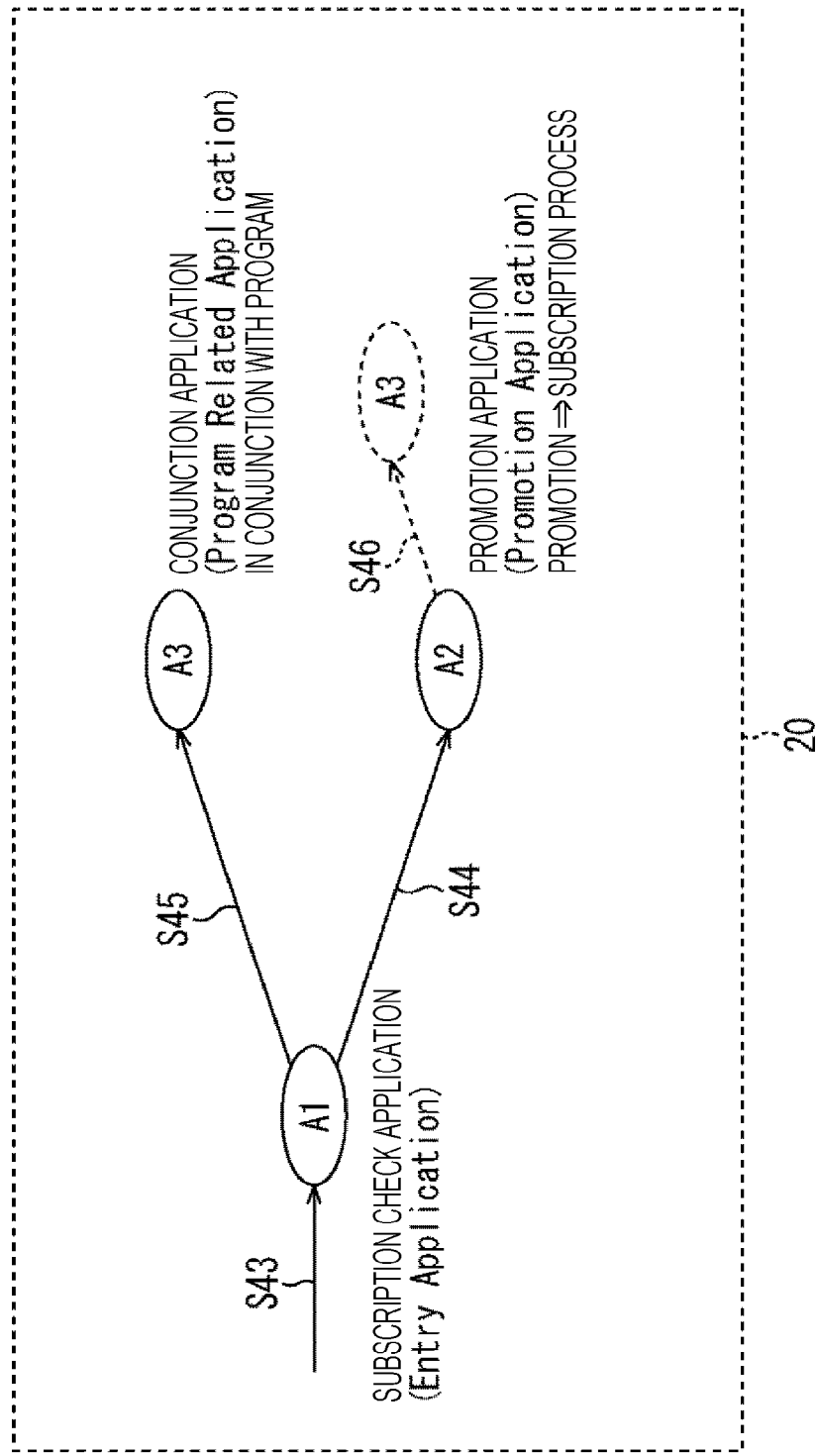
FIG. 23 is a diagram illustrating an exemplary transition of applications in FIG. 21.

More specifically, as illustrated in FIG. 23, depending on the return value of the subscription check API, in a case where the subscription to the pay service has not been made, the subscription check application A1 transitions to the promotion application A2 (S44), and in a case where the subscription to the pay service has been made, the subscription check application A1 transitions to the conjunction application A3 (S45).

In a case where transition is made from the subscription check application A1 to the promotion application A2, the reception apparatus 20 displays the message, video, and the like of the free promotion service. Then, in a case where the non-subscribing user who views the promotion performs subscription procedures for the pay service, performing the subscription process (for example, processes for licensing, billing, and payment) allows the reception apparatus 20 to descramble the pay content and allows the user to view the content. Note that after the subscription to the pay service is made, it also becomes possible to transition from the promotion application A2 to the conjunction application A3, and to cause the conjunction application A3 to operate in conjunction with the pay content (S46).

In addition, in a case where transition is made from the subscription check application A1 to the conjunction application A3 in the reception apparatus 20, the scrambled pay content is descrambled, the pay content is reproduced, and the conjunction application A3 is executed in conjunction with the pay content.

As described above, in the promotion service to which the present technology is applied in a case where the pay service provider provides a single service, the subscription check application A1 executes the subscription check API, and then executes the promotion application A2 or the conjunction application A3 depending on a result of the check.

Therefore, as in conventional promotion services, in the reception apparatus 20, a resident application does not need to execute a special process such as display and switching for providing a free promotion service, which can satisfy the request of the manufacturer of the reception apparatus 20.

In addition, instead of simply switching from the pay service to the free promotion service as in conventional promotion services, the promotion application A2 or the conjunction application A3 is executed depending on the check result of the subscription check application A1, which can provide the free promotion service with higher flexibility, and thus can satisfy the request of the pay service provider. Furthermore, since the pay service and the promotion service are provided as the same service, it is possible to avoid operational restrictions caused by providing the two services as separate services.

(Promotion Service in a Plurality of Services)

Next, a promotion service in a case where the pay service provider provides a plurality of services will be described with reference to FIGS. 24 to 25.

Figure 24:
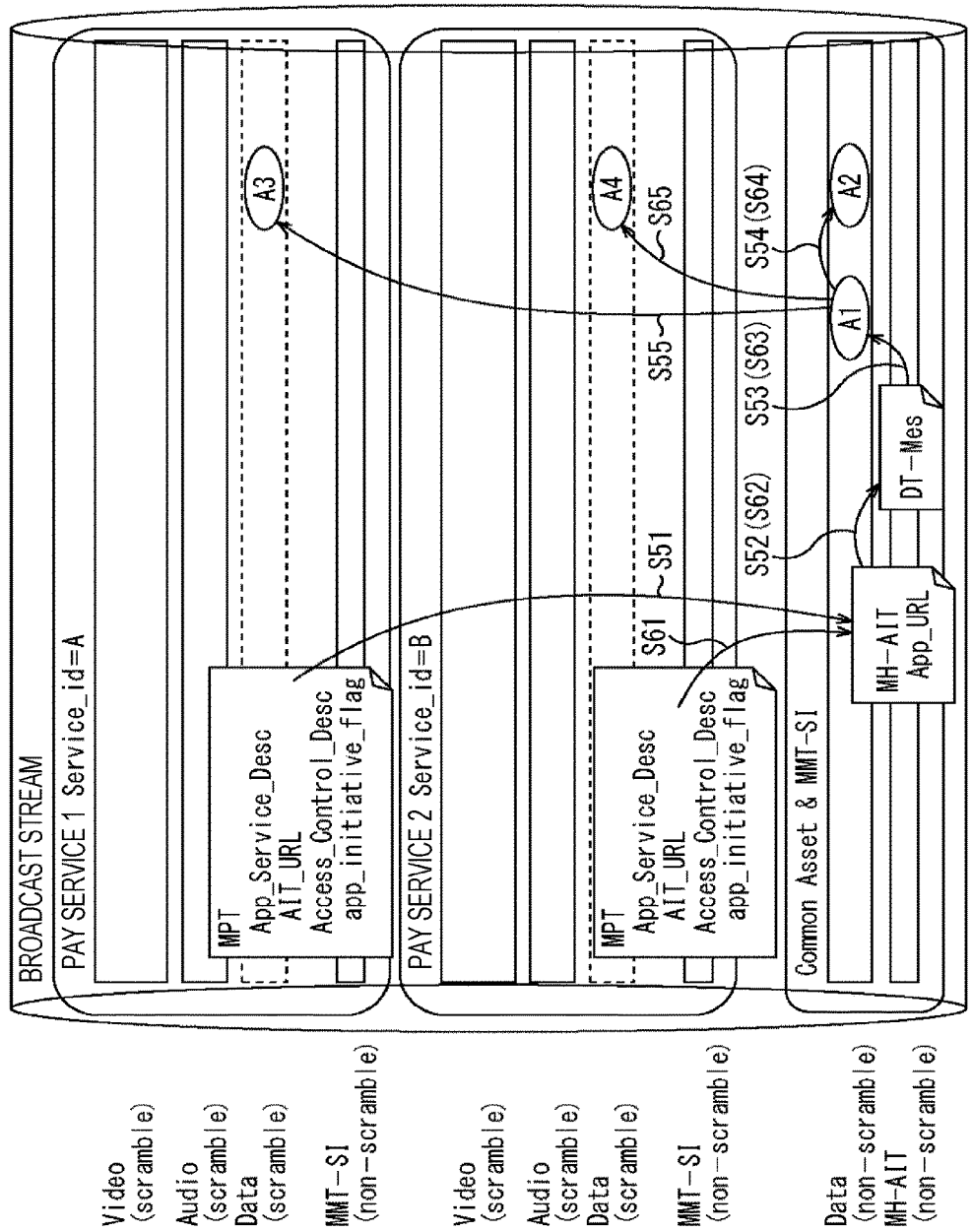
FIG. 24 is a diagram illustrating a promotion service to which the present technology is applied in a case where a plurality of services is provided.

FIG. 24 is a diagram illustrating a promotion service to which the present technology is applied in a case where a plurality of services are provided. FIG. 24 illustrates a broadcast stream to be transmitted from the transmission apparatus 10 to the reception apparatus 20, and the MMT scheme is used as the media transport scheme therefor.

In FIG. 24, in the broadcast stream, a stream of a pay service 1 to which a service ID of "A" is assigned, and a stream of a pay service 2 to which a service ID of "B" is assigned are transmitted. In addition, in the broadcast stream, a stream of asset and MMT-SI common to the pay service 1 and the pay service 2 (hereinafter referred to as common stream) is transmitted. That is, the broadcast stream of FIG. 24 corresponds to, for example, the streams of the pay services 1 and 2 to be provided by the pay service provider having two channels.

The stream of the pay service 1 includes scrambled (encrypted) streams of video, audio, and data (data broadcasting) as components that constitute the pay service 1. That is, the scrambled video, audio, and data constitute pay content 1, and only the user who has a subscription to the pay service 1 can view the pay content 1. However, as illustrated with a dotted line in the diagram, it is optional whether to transmit, for example, the stream of data (data broadcasting), such as an application, in the pay service 1.

In addition, the stream of the pay service 1 includes the stream of MMT-SI for transmitting control information for the pay service 1. The stream of MMT-SI is a non-scrambled (non-encrypted) stream.

The stream of the pay service 2 includes scrambled (encrypted) streams of video, audio, and data (data broadcasting) as components that constitute the pay service 2. That is, the scrambled video, audio, and data constitute pay content 2, and only the user who has a subscription to the pay service 2 can view the pay content 2. However, as illustrated with a dotted line in the diagram, it is optional whether to transmit, for example, the stream of data (data broadcasting), such as an application, in the pay service 2.

In addition, the stream of the pay service 2 includes the stream of MMT-SI for transmitting control information for the pay service 2. The stream of MMT-SI is a non-scrambled stream.

The common stream includes non-scrambled data (data broadcasting) and a stream of an MH application information table (MH-AIT).

Here, in a case where the user tunes into the pay service 1 in the reception apparatus 20, MPT transmitted as a PA message is acquired in the MMT-SI stream of the pay service 1. In the MPT, an application service descriptor (App_Service_Desc) and an access control descriptor (Access_Control_Desc) are placed.

The reception apparatus 20 checks an application initiative flag (app_initiative_flag) described in the access control descriptor of the MPT. Then, in a case where the application initiative flag indicates that the subscription check application exists, the reception apparatus 20 acquires the MH application information table (MH-AIT) transmitted as an M2 section message in the common stream, in accordance with information (AIT_URL) indicating where to acquire the MH application information table (MH-AIT) described in the application service descriptor (S51).

In addition, the reception apparatus 20 acquires management tables (DDMT, DAMT, DCCT) transmitted as a data transmission message (DT-Mes) in the MH-AIT stream, in accordance with an application URL (App_URL) described in the MH application information table (MH-AIT) (S52). In accordance with the description of the management tables (DDMT, DAMT, DCCT), the reception apparatus 20 acquires a subscription check application A1 to be transmitted in the non-scrambled data stream in the common stream (S53).

In a case where a return value of the subscription check API executed by the subscription check application A1 is "0", that is, in a case where the subscription to the pay service 1 has not been made, the reception apparatus 20 acquires a promotion application A2 transmitted in the stream of the non-scrambled data (data broadcasting) in the common stream (S54). Accordingly, transition is made from the subscription check application A1 to the promotion application A2, and a message, video, and the like of the free promotion service are provided by the promotion application A2.

On the other hand, in a case where the return value of the subscription check API executed by the subscription check application A1 is "1", that is, in a case where the subscription to the pay service 1 has been made, the reception apparatus 20 acquires a conjunction application A3 transmitted as the stream of the scrambled data (data broadcasting) in the stream of the pay service 1 (S55). Accordingly, transition is made from the subscription check application A1 to the conjunction application A3, and the conjunction application A3 is executed in conjunction with the pay content 1.

Note that in FIG. 24, although the stream of the pay service 2 is transmitted in the broadcast stream, in a case where the pay service 2 is tuned in to in the reception apparatus 20, the application initiative flag of the access control descriptor of the MPT is checked in a similar manner to tuning of the pay service 1. Then, in a case where the application initiative flag indicates that the subscription check application exists, in the reception apparatus 20, the MH application information table (MH-AIT) and the management tables (DDMT, DAMT, DCCT) transmitted in the common stream are acquired (S61, S62), and the subscription check application A1 is further acquired (S63).

Then, in the reception apparatus 20, in a case where the return value of the subscription check API executed by the subscription check application A1 is "0", that is, in a case where the subscription to the pay service 2 has not been made, the promotion application A2 to be transmitted as the stream of the non-scrambled data (data broadcast) is acquired in the common stream (S64). In this case, in the reception apparatus 20, a message, video, and the like of the free promotion service for the pay service 2 are provided by the promotion application A2.

On the other hand, in the reception apparatus 20, in a case where the return value of the subscription check API executed by the subscription check application A1 is "1", that is, in a case where the subscription to the pay service 2 has been made, a conjunction application A4 to be transmitted as the stream of the scrambled data (data broadcast) is acquired in the stream of the pay service 2 (S65). In this case, in the reception apparatus 20, the conjunction application A4 is executed in conjunction with the pay content 2.

Figure 25:
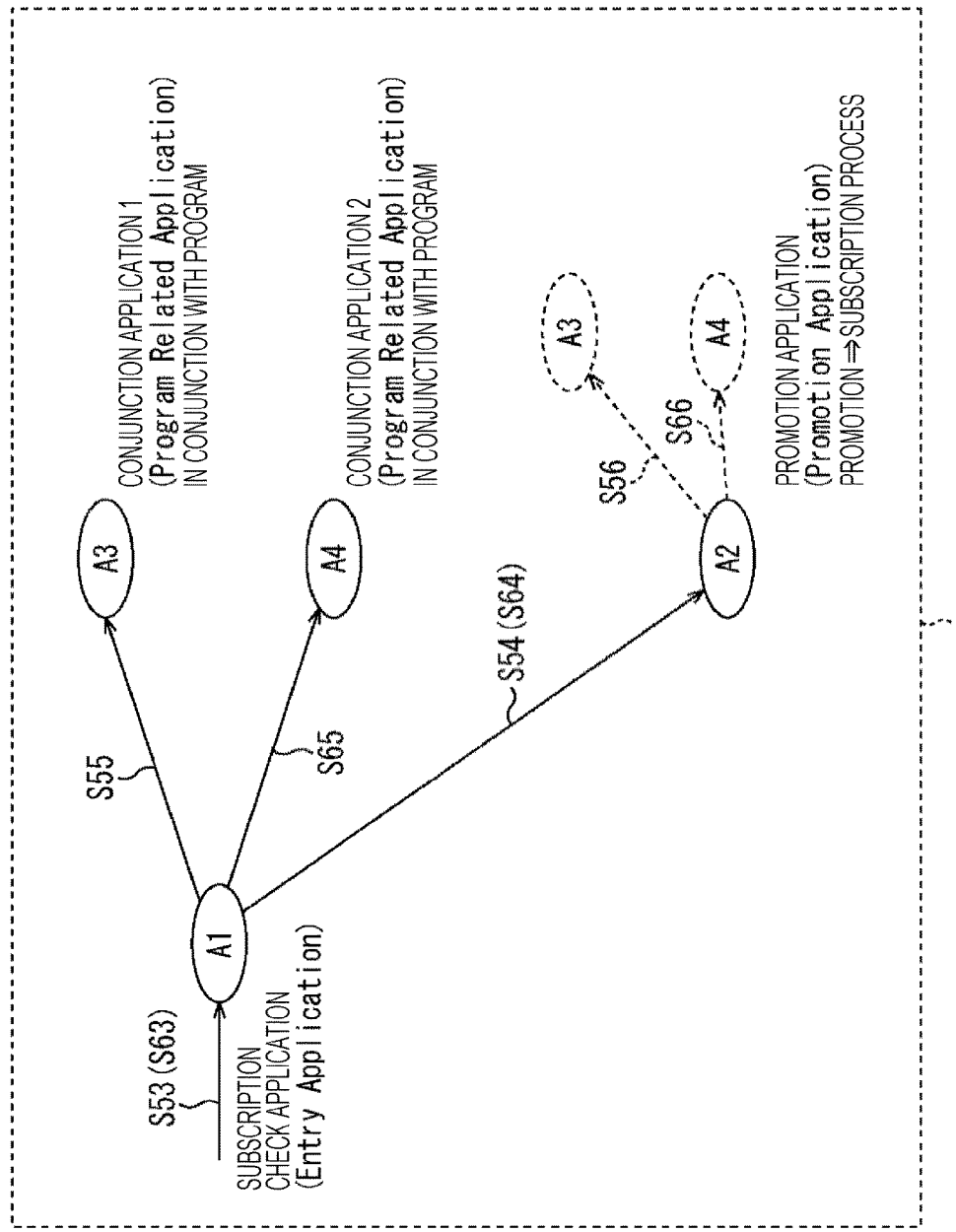
FIG. 25 is a diagram illustrating an exemplary transition of applications of FIG. 24.

More specifically, as illustrated in FIG. 25, in a case where the pay service 1 is tuned in to, depending on the return value of the subscription check API, in a case where the subscription to the pay service 1 has not been made, the subscription check application A1 transitions to the promotion application A2 (S54), and in a case where the subscription to the pay service 1 has been made, the subscription check application A1 transitions to the conjunction application A3 (S55).

In a case where transition is made from the subscription check application A1 to the promotion application A2, the reception apparatus 20 displays the message, video, and the like of the free promotion service. Then, in a case where the non-subscribing user who views the promotion performs subscription procedures to the pay service 1, performing the subscription process (for example, processes for licensing, billing, and payment) allows the reception apparatus 20 to descramble the pay content 1 and allows the user to view the pay content 1. Note that after the subscription to the pay service 1 is made, it also becomes possible to transition from the promotion application A2 to the conjunction application A3, and to cause the conjunction application A3 to operate in conjunction with the pay content 1 (S56).

In addition, in a case where transition is made from the subscription check application A1 to the conjunction application A3 in the reception apparatus 20, the scrambled pay content 1 is descrambled, the pay content 1 is reproduced, and the conjunction application A3 is executed in conjunction with the pay content 1.

On the other hand, when the pay service 2 is tuned in to, depending on the return value of the subscription check API, in a case where the subscription to the pay service 2 has not been made, the subscription check application A1 transitions to the promotion application A2 (S64), and in a case where the subscription to the pay service 2 has been made, the subscription check application A1 transitions to the conjunction application A4 (S65).

In a case where transition is made from the subscription check application A1 to the promotion application A2, the reception apparatus 20 displays the message, video, and the like of the free promotion service. Then, in a case where the non-subscribing user who views the promotion performs subscription procedures for the pay service 2, performing the subscription process (for example, processes for licensing, billing, and payment) allows the reception apparatus 20 to descramble the pay content 2 and allows the user to view the pay content 2. Note that after the subscription to the pay service 2 is made, it also becomes possible to transition from the promotion application A2 to the conjunction application A4, and to cause the conjunction application A4 to operate in conjunction with the pay content 2 (S66).

In addition, in a case where transition is made from the subscription check application A1 to the conjunction application A4 in the reception apparatus 20, the scrambled pay content 2 is descrambled, the pay content 2 is reproduced, and the conjunction application A4 is executed in conjunction with the pay content 2.

As described above, in the promotion service to which the present technology is applied in a case where the pay service provider provides a plurality of services, the subscription check application A1 executes the subscription check API, and executes the promotion application A2 or the conjunction application A3 (A4) depending on the check result.

Therefore, as in the conventional promotion service, in the reception apparatus 20, the resident application does not need to execute a special process such as display and switching for providing the free promotion service, which can satisfy the request of the manufacturer of the reception apparatus 20.

In addition, instead of simply switching from the pay service to the free promotion service as in the conventional promotion service, the promotion application A2 or the conjunction application A3 (A4) is executed depending on the check result of the subscription check application A1, which can provide the free promotion service with higher flexibility and thus can satisfy the request of the pay service provider.

<4. Exemplary Syntax>
(Application Service Descriptor)

FIG. 26 is a diagram illustrating exemplary syntax of the application service descriptor (Application_Service_Descriptor).

A 16-bit descriptor_tag is a tag for identifying the application service descriptor. An 8-bit descriptor_length is a descriptor length of the application service descriptor.

An 8-bit application_format_map indicates a scheme applied to the application in a bit map format. For example, in this bit map, a head bit 0 can be assigned to HTML 5, and an operation can be performed with a fixed value of "0x01." In this case, the reception apparatus 20 confirms only that the bit 0 in the bit map is "1", and neglects other bits.

A 1-bit default_AIT_flag is a flag indicating whether a default AIT (MH-AIT) to be monitored or not. For example, in a case where the AIT (MH-AIT) is transmitted by communication, "0" is set as default_AIT_flag, whereas in a case where the AIT (MH-AIT) is transmitted by broadcasting, "1" is set as default_AIT_flag.

A 1-bit DT_message_flag is a flag indicating presence of distribution of a data transmission message (DT-Mes). For example, in a case where application data is transmitted by broadcasting, "1" is set as DT_message_flag. A 2-bit reserved_future_use is secured following DT_message_flag as a region for future extension.

A 4-bit EMT_num indicates the number of distributions of an event message table (EMT). The maximum number of distributions of EMT is 8.

AIT_location_info( ) indicates where to acquire the AIT (MH-AIT). MMT_general_location_info( ) corresponds to location information of FIG. 12. That is, for example, in a case where the AIT (MH-AIT) is transmitted by broadcasting, "0" is set as location_type, and a packet ID for acquiring the AIT (MH-AIT) is set. In addition, for example, in a case where the AIT (MH-AIT) is transmitted by communication, "5" is set as location_type, and URL for acquiring the AIT (MH-AIT) is set.

In a case where "1" is set as DT_message_flag, DT_message_location_info ( ) is placed. DT_message_location_info ( ) indicates where to acquire the data transmission message. MMT_general_location_info ( ) corresponds to the location information of FIG. 12. That is, for example, in a case where the data transmission message is transmitted by broadcasting, "0" is set as location_type, and a packet ID for acquiring the data transmission message is set.

EMT_location_info ( ) is set depending on the number of distributions of EMT indicated by EMT_num. EMT_location_info ( ) indicates where to acquire the EMT. MMT_general_location_info ( ) corresponds to the location information of FIG. 12. That is, for example, in a case where the EMT is transmitted by broadcasting, "0" is set as location_type, and a packet ID for acquiring the EMT is set.

(Access Control Descriptor)

FIG. 27 is a diagram illustrating exemplary syntax of the access control descriptor (Access_Control_Descriptor).

A 16-bit descriptor_tag is a tag for identifying the access control descriptor. An 8-bit descriptor_length is a descriptor length of the access control descriptor.

A 16-bit CA_system_ID is an identifier indicating a type of conditional access system. MMT_general_location_info ( ) is information indicating a location of the MMTP packet including related information. In a case where being placed in the MPT, MMT_general_location_info ( ) indicates a location of the ECM.

Eight×N-bit private_data is a region to write arbitrary data. In the private_data, a type of data is identified with a tag indicated by a 4-bit data_segment_tag, and a data length is set by a 4-bit data_length, and thus various types of data can be placed Here, in a case where "0x1" is set as the data_segment_tag and "0x1" is set as the data_length, 1-bit app_initiative_flag is placed. The app_initiative_flag is an application initiative flag indicating presence of the subscription check application.

For example, in a case where "1" is set as the app_initiative_flag, this indicates that the subscription check application exists and the promotion service to which the present technology is applied is supported by the pay related application. In this case, the subscription check application is executed, and the promotion application or the conjunction application is executed depending on the subscription check result.

Note that 7-bit reserved_future_use is reserved as a future extension region in the private_data. In addition, the syntax of the access control descriptor of FIG. 27 is one example, and another syntax may be employed.

<5. Configuration of Each Apparatus>

(Exemplary Configuration of Transmission Apparatus)

Figure 28:
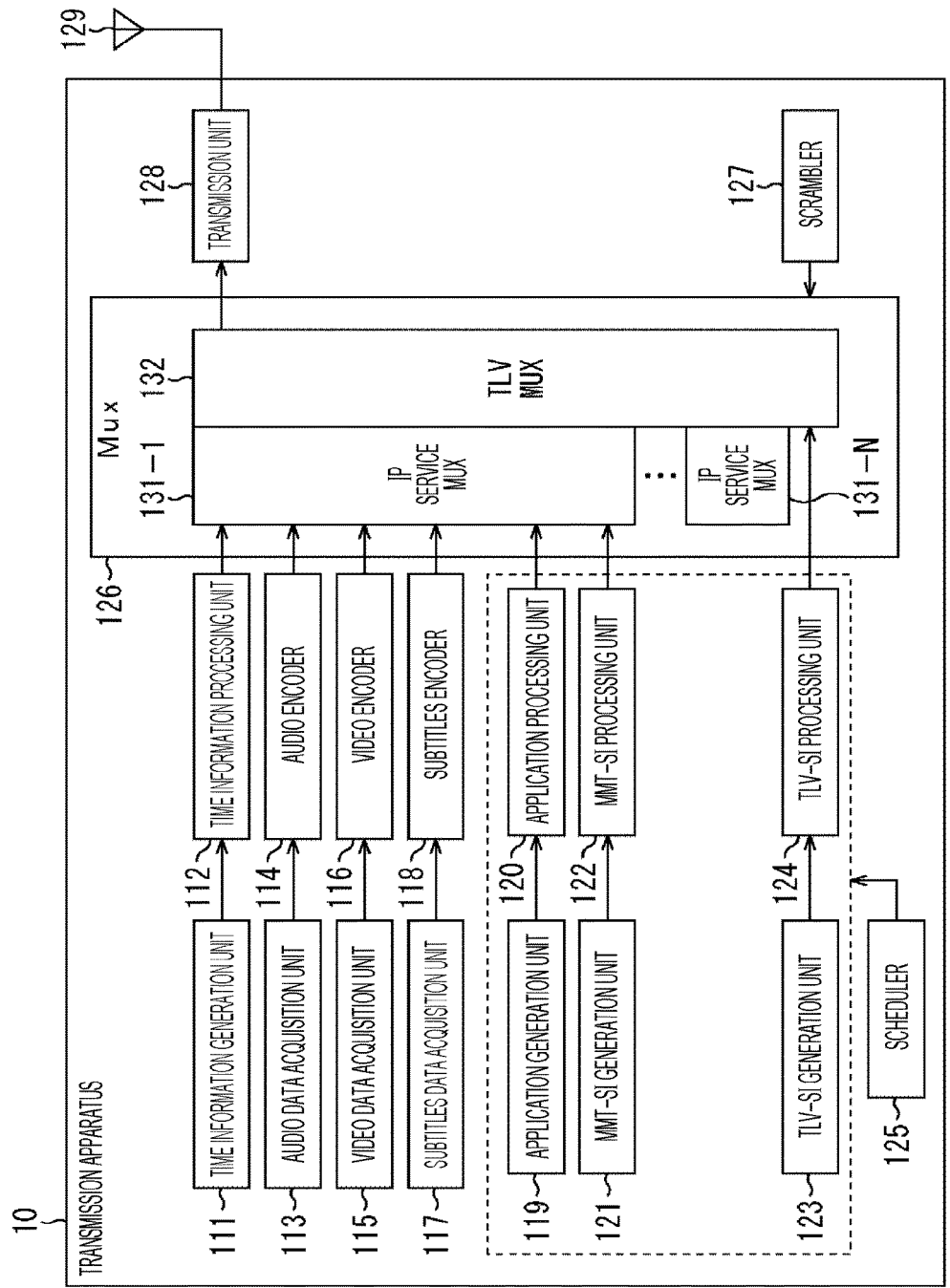
FIG. 28 is a diagram illustrating an exemplary configuration of a transmission apparatus.

FIG. 28 is a diagram illustrating an exemplary configuration of the transmission apparatus 10 of FIG. 18.

In FIG. 28, the transmission apparatus 10 includes a time information generation unit 111, a time information processing unit 112, an audio data acquisition unit 113, an audio encoder 114, a video data acquisition unit 115, a video encoder 116, a subtitles data acquisition unit 117, a subtitles encoder 118, an application generation unit 119, an application processing unit 120, an MMT-SI generation unit 121, an MMT-SI processing unit 122, a TLV-SI generation unit 123, a TLV-SI processing unit 124, a scheduler 125, a multiplexer (Mux) 126, a scrambler 127, and a transmission unit 128.

The time information generation unit 111 generates time information, such as NTP, and supplies the time information to the time information processing unit 112. The time information processing unit 112 processes the time information (NTP) supplied from the time information generation unit 111, and then supplies the processed time information to the multiplexer 126.

The audio data acquisition unit 113 acquires audio data as a component from a built-in storage, an external server, a microphone, or the like, and then supplies the acquired audio data to the audio encoder 114. The audio encoder 114 encodes the audio data supplied from the audio data acquisition unit 113 in accordance with a coding scheme, such as AAC, and then supplies the encoded audio data to the multiplexer 126.

The video data acquisition unit 115 acquires video data as a component from a built-in storage, an external server, a camera, or the like, and then supplies the acquired video data to the video encoder 116. The video encoder 116 encodes the video data supplied from the video data acquisition unit 115 in accordance with a coding scheme, such as HEVC, and then supplies the encoded video data to the multiplexer 126.

The subtitles data acquisition unit 117 acquires subtitles data as a component from a built-in storage, an external server, or the like, and then supplies the acquired subtitles data to the subtitles encoder 118. The subtitles encoder 118 encodes the subtitles data supplied from the subtitles data acquisition unit 117 in accordance with a predetermined encoding scheme, and then supplies the encoded subtitles data to the multiplexer 126. Note that the subtitles data is described in a TTML format.

The application generation unit 119 generates application data in an HTML 5 format on the basis of raw data for generating applications, such as pay related applications (for example, HTML file and JPEG file), and then supplies the generated application data to the application processing unit 120. The application processing unit 120 performs, for example, a process for transmission as data broadcasting on the application data in an HTML 5 format supplied from the application generation unit 119, and then supplies the application data to the multiplexer 126.

The MMT-SI generation unit 121 generates MMT-SI on the basis of raw data for generating the MMT-SI, and then supplies the generated MMT-SI to the MMT-SI processing unit 122. The MMT-SI processing unit 122 performs, for example, a process for transmission as MMT control information on the MMT-SI supplied from the MMT-SI generation unit 121, and then supplies the MMT-SI to the multiplexer 126.

The TLV-SI generation unit 123 generates TLV-SI on the basis of raw data for generating the TLV-SI, and then supplies the generated TLV-SI to the TLV-SI processing unit 124. The TLV-SI processing unit 124 performs, for example, a process for transmission as TLV control information on the TLV-SI supplied from the TLV-SI generation unit 123, and then supplies the TLV-SI to the multiplexer 126.

The scheduler 125 controls units from the application generation unit 119 to the TLV-SI processing unit 124 to manage timing to transmit the application, MMT-SI, and TLV-SI.

The multiplexer 126 is provided with the time information (NTP) from the time information processing unit 112, the audio data from the audio encoder 114, the video data from the video encoder 116, the subtitles data from the subtitles encoder 118, the application data from the application processing unit 120, the MMT-SI from the MMT-SI processing unit 122, and the TLV-SI from the TLV-SI processing unit 124.

The multiplexer 126 multiplexes the time information (NTP), the component data of audio, video and subtitles, the application data, the MMT-SI control information, and the TLV-SI control information into a broadcast stream, and then supplies the generated broadcast stream to the transmission unit 128.

Here, the multiplexer 126 includes IP service MUXs 131-1 to 131-N (N is an integer equal to or greater than 1) and a TLVMUX 132.

The IP service MUXs 131-1 to 131-N multiplex the time information (NTP), the component data, the application data, and the control information (MMT-SI) for each service. The TLVMUX 132 further multiplexes data of each service multiplexed by the IP service MUXs 131-1 to 131-N, and the control information (TLV-SI).

In addition, the scrambler 127 uses the scramble key (Ks) to scramble (encrypt) components and application data supplied to the multiplexer 126 as necessary.

For example, in a case where pay content includes components of audio, video, and subtitles, the scrambler 127 scrambles data of these components by using the scramble key (Ks). In addition, for example, in a case where a pay related application is transmitted as an application, while the scrambler 127 scrambles data of a conjunction application by using the scramble key (Ks), the scrambler 127 considers data of the subscription check application and the promotion application as non-scrambled (non-encrypted) data. Note that although not illustrated for simple description, the EMM and the ECM as control information are included in the broadcast stream.

The transmission unit 128 transmits the broadcast stream supplied from the multiplexer 126 via an antenna 129 as a digital broadcast signal (broadcast wave).

Note that the transmission apparatus 10 of FIG. 28 transmits a digital broadcast signal compatible with the MMT scheme, and details of the data transmission using the MMT scheme are as described earlier with reference to FIGS. 1 to 17.

(Exemplary Configuration of Reception Apparatus)

Figure 29:
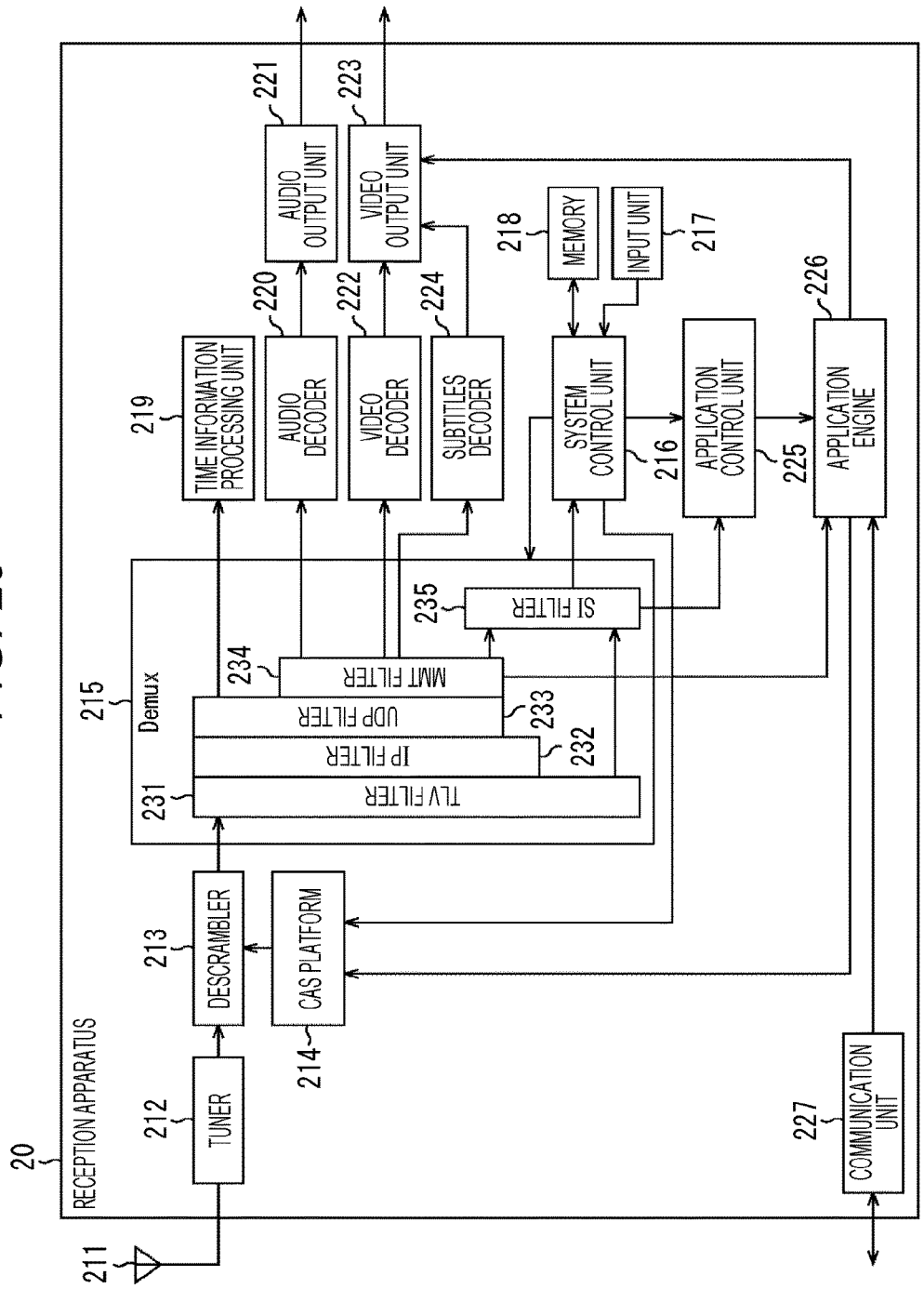
FIG. 29 is a diagram illustrating an exemplary configuration of the reception apparatus.

FIG. 29 is a diagram illustrating an exemplary configuration of the reception apparatus 20 of FIG. 18.

In FIG. 29, the reception apparatus 20 includes a tuner 212, a descrambler 213, a CAS platform 214, a demultiplexer (Demux) 215, a system control unit 216, an input unit 217, a memory 218, a time information processing unit 219, an audio decoder 220, an audio output unit 221, a video decoder 222, a video output unit 223, a subtitles decoder 224, an application control unit 225, an application engine 226, and a communication unit 227.

The tuner 212 demodulates a digital broadcast signal (broadcast wave) received via an antenna 211, and supplies a resulting broadcast stream to the descrambler 213.

The descrambler 213 descrambles a scrambled stream out of the broadcast stream supplied from the tuner 212 by using the scramble key (Ks) supplied from the CAS platform 214. A non-scrambled stream and the descrambled stream are supplied to the demultiplexer 215.

The CAS platform 214 provides a function of the conditional access system (CAS) in the reception apparatus 20. In a case where a license for a pay service is provided from the application engine 226, the CAS platform 214 holds the license. Then, in a case where the ECM is input (injected) from the system control unit 216, the CAS platform 214 decodes the ECM with the work key (Ks), and compares a resulting reference license key with a license key of the held license, thereby performing a license determination process.

In a case where this license determination process indicates that a condition of the license determination is satisfied, the scramble key (Ks) is read from the encrypted part of the ECM, and is supplied (output) to the descrambler 213. Note that the work key (Ks) held by the CAS platform 214 is obtained by, for example, decoding the encrypted part of the EMM transmitted in a broadcast stream with the device key (Kd).

Under control from the system control unit 216, the demultiplexer 215 divides the broadcast stream supplied from the descrambler 213 into the time information (NTP), the component data of audio, video, and subtitles, the application data, and the control information such as MMT-SI and TLV-SI, and then outputs the divided data to a downstream block.

Specifically, the demultiplexer 215 includes a TLV filter 231, an IP filter 232, a UDP filter 233, an MMT filter 234, and an SI filter 235.

The TLV filter 231 performs a filtering process on the basis of the TLV header and supplies the TLV-SI to the SI filter 235. The IP filter 232 performs a filtering process on the basis of the IP header. The UDP filter 233 performs a filtering process on the basis of the UDP header. The MMT filter 234 performs a filtering process on the basis of the MMT packet header or the MMT payload header.

The MMT-SI is supplied to the SI filter 235 through the filtering processes from the TLV filter 231 to the MMT filter 234. The SI filter 235 performs a predetermined filtering process and supplies the control information such as TLV-SI or MMT-SI to the system control unit 216 as appropriate. In addition, the SI filter 235 supplies the MH application information table (MH-AIT) to the application control unit 225.

The system control unit 216 controls an operation of each unit on the basis of the control information supplied from the demultiplexer 215 (such as MMT-SI, TLV-SI, EMM, ECM). The input unit 217 receives an operation of a user, and supplies an operation signal to the system control unit 216. The memory 218 is a nonvolatile memory, such as a non volatile RAM (NVRAM). The memory 218 records various kinds of data (for example, TLV-SI) under control from the system control unit 216.

In addition, through the filtering processes of the TLV filter 231 to the MMT filter 234, the time information (NTP) is supplied to the time information processing unit 219, the audio data is supplied to the audio decoder 220, the video data is supplied to the video decoder 222, the subtitles data is supplied to the subtitles decoder 224, and the application data is supplied to the application engine 226.

The time information processing unit 219 performs a process for synchronizing a transmission side and a reception side on the basis of the time information (NTP) supplied from the demultiplexer 215.

The audio decoder 220 decodes the audio data supplied from the demultiplexer 215 in accordance with a decoding scheme, such as AAC, and then supplies the decoded audio data to the audio output unit 221. The audio output unit 221 supplies the audio data supplied from the audio decoder 220 to a speaker (not illustrated) in a downstream stage. Accordingly, for example, audio of the pay content is output from the speaker.

The video decoder 222 decodes the video data supplied from the demultiplexer 215 in accordance with a decoding scheme, such as HEVC, and then supplies the decoded video data to the video output unit 223. In addition, the subtitles decoder 224 decodes the subtitles data supplied from the demultiplexer 215 in accordance with a predetermined decoding scheme, and then supplies the decoded subtitles data to the video output unit 223.

The video output unit 223 supplies the video data supplied from the video decoder 222 and the subtitles data supplied from the subtitles decoder 224 to a display unit (not illustrated) in a downstream stage. Accordingly, for example, video and subtitles of the pay content are displayed on the display unit.

The application control unit 225 controls the application engine 226 under control from the system control unit 216. In addition, the application control unit 225 controls the application engine 226 on the basis of the MH application information table (MH-AIT) supplied from the demultiplexer 215.

The application engine 226 is, for example, a browser that supports HTML 5. The application engine 226 requests the communication unit 227 to acquire an application (for example, pay related application) under control from the application control unit 225.

In response to the request from the application engine 226, the communication unit 227 accesses the server 30 over the Internet 90 and requests the application. The communication unit 227 receives the application data distributed from the server 30 over the Internet 90, and then supplies the application data to the application engine 226.

The application engine 226 is provided with the application data in an HTML 5 format from the demultiplexer 215 or the communication unit 227. The application engine 226 executes the application under control from the application control unit 225. Video data supported by the application that is being executed is supplied to the video output unit 223.

For example, the video output unit 223 supplies the video data supplied from the application engine 226 to the display unit. Accordingly, the video of the application is displayed on the display unit. In addition, for example, the video output unit 223 can also composite the video data supplied from the application engine 226 with the video data supplied from the video decoder 222, and then display the resulting video on the display unit.

In addition, the communication unit 227 accesses the server 30 over the Internet 90 in response to the request from the application engine 226, and requests the license for the pay service. The communication unit 227 receives the license distributed from the server 30 over the Internet 90, and then supplies the license to the application engine 226.

The application engine 226 supplies the license supplied from the communication unit 227 to the CAS platform 214.

Note that the reception apparatus 20 of FIG. 29 receives a digital broadcast signal compatible with the MMT scheme, and details of data transmission using the MMT scheme are as described earlier with reference to FIGS. 1 to 17. In addition, although the reception apparatus 20 of FIG. 29 has a configuration that has neither speaker nor display unit, for example, in a case where the reception apparatus 20 is configured as a television receiver, the reception apparatus 20 can have a speaker and a display unit. In addition, the reception apparatus 20 may not be a fixed receiver, but may be, for example, a mobile receiver, such as a smart phone, a tablet terminal, and a portable telephone.

In addition, although not illustrated for simple description in FIG. 29, in a case where audio or video data is received over the Internet 90 from the server 30, the audio data is supplied to the audio decoder 220, and the video data is supplied to the video decoder 222. In addition, in a case where the control information, such as MMT-SI, is received over the Internet 90 from the server 30, the control information is supplied to the system control unit 216.

<6. Process Flow to be Executed by Each Apparatus>

Figure 30:
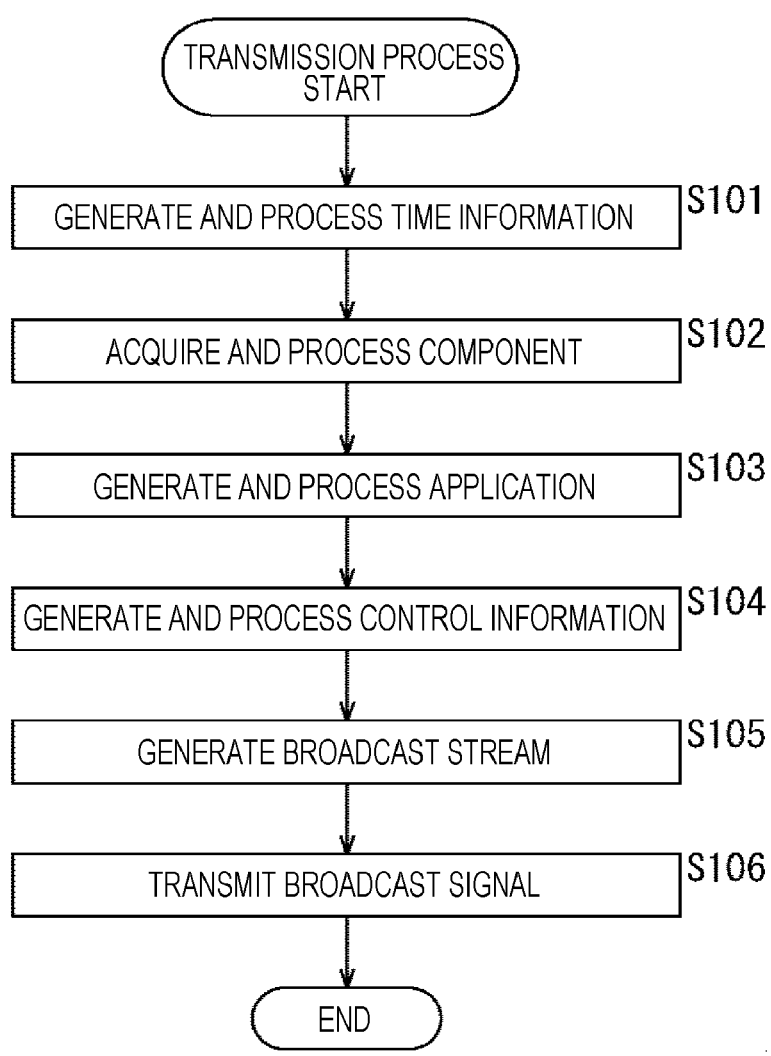
FIG. 30 is a flowchart illustrating a transmission process.

Next, a specific process to be executed by each apparatus that constitutes the broadcast communication system 1 of FIG. 18 will be described with reference to FIGS. 30 to 32.

(Transmission Process)

To begin with, a transmission process flow to be executed by the transmission apparatus 10 of FIG. 18 will be described with reference to a flowchart of FIG. 30.

In step S101, the time information generation unit 111 generates the time information (NTP). In addition, in step S101, the time information processing unit 112 processes the time information (NTP) generated by the time information generation unit 111.

In step S102, the audio data acquisition unit 113 acquires audio data from a storage or the like. In addition, in step S102, the audio encoder 114 encodes the audio data acquired by the audio data acquisition unit 113 in accordance with an encoding scheme such as AAC.

In step S102, the video data acquisition unit 115 acquires video data from a storage or the like. In addition, in step S102, the video encoder 116 encodes the video data acquired by the video data acquisition unit 115 in accordance with an encoding scheme such as HEVC.

In step S102, the subtitles data acquisition unit 117 acquires subtitles data from a storage or the like. In addition, in step S102, the subtitles encoder 118 encodes the subtitles data acquired by the subtitles data acquisition unit 117 in accordance with a predetermined encoding scheme.

In step S103, the application generation unit 119 generates application data in accordance with management of the scheduler 125 on the basis of raw data of the application. In addition, in step S103, the application processing unit 120 processes the application data generated by the application generation unit 119.

In step S104, the MMT-SI generation unit 121 generates MMT-SI in accordance with management of the scheduler 125 on the basis of raw data of MMT-SI. In addition, in step S104, the MMT-SI processing unit 122 processes the MMT-SI generated by the MMT-SI generation unit 121.

In step S104, the TLV-SI generation unit 123 generates TLV-SI in accordance with management of the scheduler 125 on the basis of raw data of TLV-SI. In addition, in step S104, the TLV-SI processing unit 124 processes the TLV-SI generated by the TLV-SI generation unit 123.

In step S105, the multiplexer 126 multiplexes the time information (NTP) processed in step S101, the component data of video, audio, and subtitles processed in step S102, the application data processed in step S103, and the control information (MMT-SI, TLV-SI) processed in step S104, and then the multiplexer 126 generates a broadcast stream.

Note that in step S105, the scrambler 127 uses the scramble key (Ks) as necessary to scramble (encrypt) the component and application data to be supplied to the multiplexer 126.

In step S106, the transmission unit 128 transmits the broadcast stream generated in the process of step S105 via the antenna 129 as a digital broadcast signal (broadcast wave).

The transmission process flow has been described above.
(Tuning Process)

Next, a tuning process flow to be executed by the reception apparatus 20 of FIG. 18 will be described with reference to a flowchart of FIG. 31. Note that the tuning process of FIG. 31 is executed, for example, in a case where a desired service is tuned in to by a user operating a remote controller.

In step S201, the system control unit 216 controls the demultiplexer 215 to acquire MPT transmitted as a PA message.

In step S202, the system control unit 216 determines whether an access control descriptor exists in the MPT acquired in the process of step S201.

In a case where it is determined in step S202 that the access control descriptor does not exist in the MPT, the process proceeds to step S203. In this case, since the service that is tuned in to by the user is a non-scrambled service, in step S203, the system control unit 216 controls each unit of the reception apparatus 20 to perform reception and reproduction processes of the non-scrambled service.

On the other hand, in a case where it is determined in step S202 that the access control descriptor exists in the MPT, the process proceeds to step S204. In step S204, the system control unit 216 controls the demultiplexer 215 or the like on the basis of the access control descriptor placed in the MPT to acquire the ECM transmitted in the broadcast stream.

In step S205, the system control unit 216 inputs (injects) the ECM acquired in the process of step S204 into the CAS platform 214.

In step S206, the system control unit 216 determines whether "1" has been set as an application initiative flag (app_initiative_flag) described in the access control descriptor.

In a case where it is determined in step S206 that "0" has been set as the application initiative flag, the process proceeds to step S207. In step S207, the system control unit 216 determines whether the scramble key (Ks) is output from the CAS platform 214 to which the ECM has been input (injected) in the process of step S205.

In a case where it is determined in step S207 that the scramble key (Ks) is output from the CAS platform 214, the process proceeds to step S208. In step S208, the descrambler 213 uses the scramble key (Ks) that is output from the CAS platform 214 to descramble the digital broadcast signal received by the tuner 212.

In step S209, the system control unit 216 controls each unit of the reception apparatus 20 to perform reception and reproduction processes of the scrambled service descrambled in the process of step S208, the service being tuned in to by the user. That is, in this case, pay content provided as a pay service will be reproduced.

Note that in a case where it is determined in step S207 that the scramble key (Ks) is not output from the CAS platform 214, the process proceeds to step S210. In this case, since the service (pay service) that is tuned in to by the user is not subscribed to, display is made indicating that the service is not subscribed to (S210).

In addition, in a case where it is determined in step S206 that "1" has been set as the application initiative flag, the process proceeds to step S211. In step S211, the pay related application process is executed.

In this pay related application process, the subscription check application is executed, and depending on the subscription check result, the promotion application or the conjunction application is executed. Note that details of the pay related application process will be described later with reference to a flowchart of FIG. 32.

Upon completion of the process of step S211, or in parallel with the process of step S211, the process of step S212 is executed. In step S212, the system control unit 216 determines whether the scramble key (Ks) is output from the CAS platform 214 to which the ECM has been input (injected) in the process of step S205.

In a case where it is determined in step S212 that the scramble key (Ks) is output from the CAS platform 214, the process proceeds to step S208. In steps S208 and S209, reception and reproduction processes of the scrambled service are performed. That is, in this case, the pay content provided as the pay service is reproduced.

Figure 31:
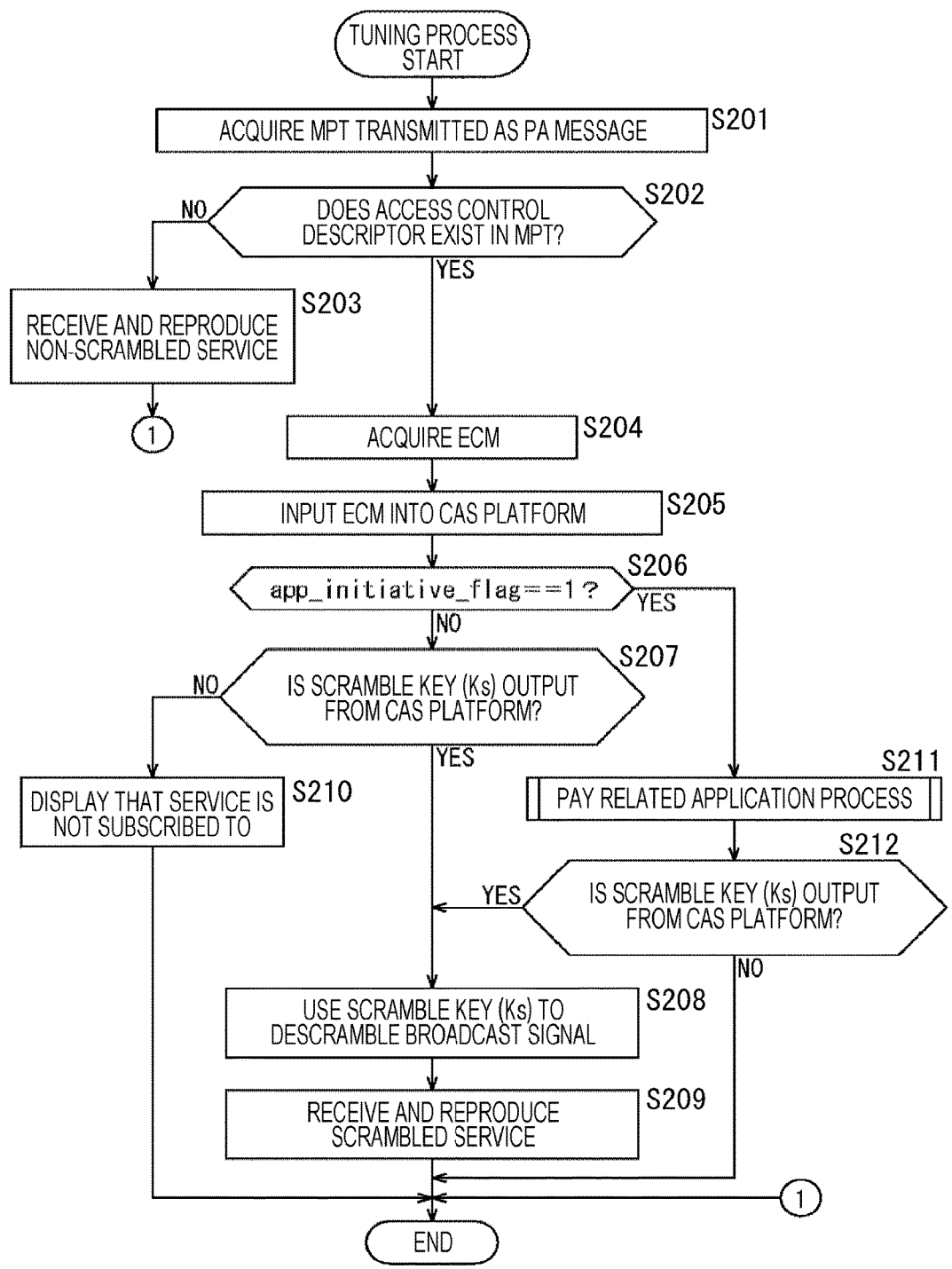
FIG. 31 is a flowchart illustrating a tuning process.
Figure 32:
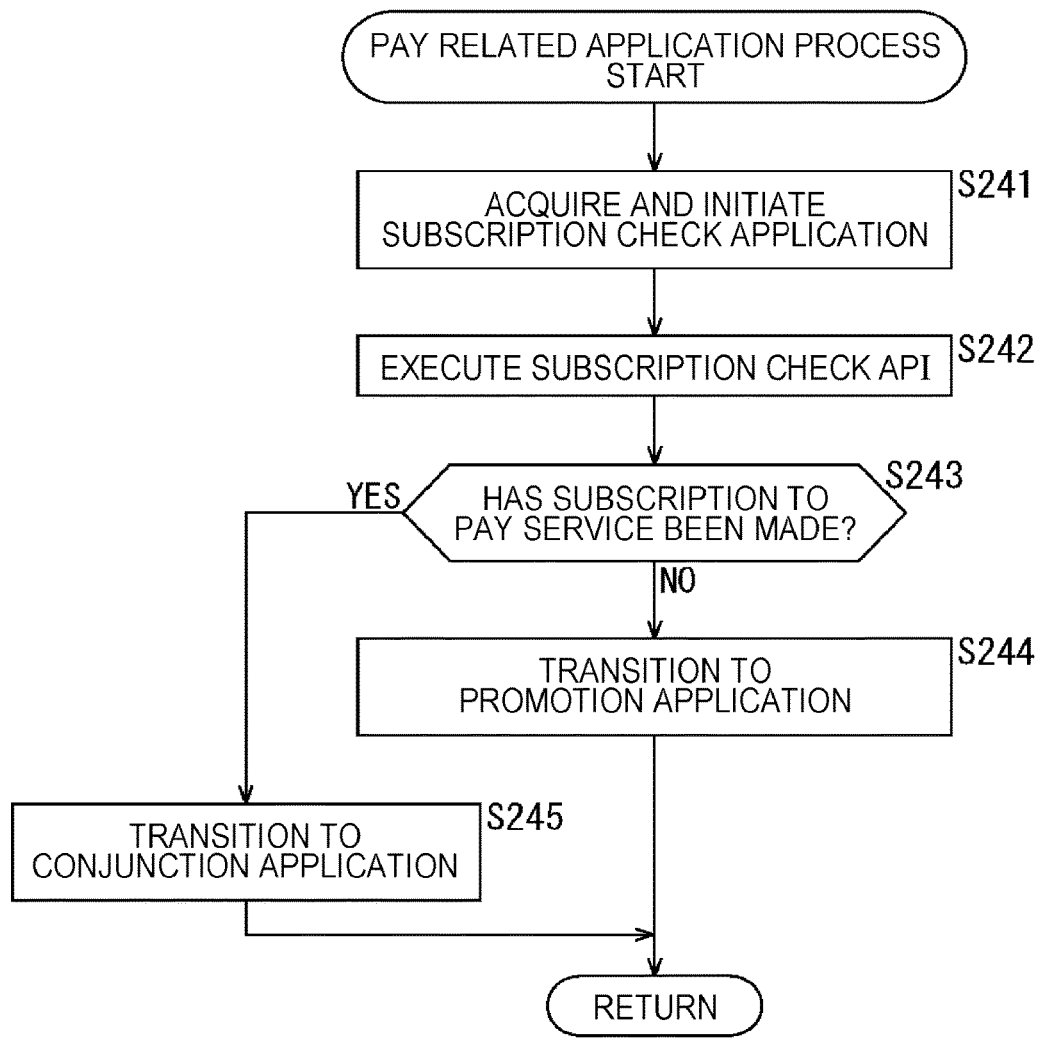
FIG. 32 is a flowchart illustrating a pay related application process.

Note that in a case where the processes of steps S203, S209, and S210 are finished, or in a case where it is determined in step S212 that the scramble key (Ks) is not output from the CAS platform 214, the tuning process of FIG. 31 is finished.

The tuning process flow has been described above.
(Pay Related Application Process)

Next, details of the pay related application process corresponding to the process of step S211 of FIG. 31 will be described with reference to FIG. 32.

In step S241, under control of the application control unit 225, the application engine 226 acquires and initiates the subscription check application transmitted in a stream of non-scrambled data (data broadcasting).

In step S242, under control of the application control unit 225, the application engine 226 causes the subscription check application to execute the subscription check API.

In step S243, under control of the application control unit 225, the application engine 226 determines whether the return value of the subscription check API is "1", that is, whether the subscription to the service that is tuned in to by the user (pay service) has been made.

In a case where it is determined in step S243 that the return value of the subscription check API is "0", that is, the subscription to the pay service has not been made, the process proceeds to step S244. In step S244, under control of the application control unit 225, the application engine 226 acquires and initiates the promotion application transmitted in a stream of non-scrambled data (data broadcasting).

Accordingly, transition is made from the subscription check application to the promotion application, and a message, video, and the like of the free promotion service are provided. Then, in a case where the non-subscribing user who views the promotion performs subscription procedures for the pay service, performing the subscription process (for example, processes for licensing, billing, and payment) allows the reception apparatus 20 to descramble the pay content and allows the user to view the pay content. Note that after the subscription to the pay service is made, it also becomes possible to transition from the promotion application to the conjunction application, and to cause the conjunction application to operate in conjunction with the pay content (steps S208 and S209 of FIG. 31).

On the other hand, in a case where it is determined in step S243 that the return value of the subscription check API is "1", that is, in a case where the subscription to the pay service has been made, the process proceeds to step S245. In step S245, under control of the application control unit 225, the application engine 226 acquires and initiates the conjunction application transmitted in a stream of scrambled data (data broadcasting). Note that here, the descrambler 213 descrambles the digital broadcast signal received by the tuner 212 by using the scramble key (Ks) that is output from the CAS platform 214, thereby descrambling the conjunction application.

Accordingly, transition is made from the subscription check application to the conjunction application, and the conjunction application is executed in conjunction with the descrambled pay content provided by the service that is tuned in to by the user (steps S208 and S209 of FIG. 31).

The pay related application process flow has been described above.

<7. Variation>

In the above description, the MMT scheme has been described as the media transport scheme, but for example, another method may be employed such as MPEG2-TS.

Note that examples of the digital television broadcasting standard to which the present technology is applicable include integrated services digital broadcasting (ISDB), which is a scheme employed in Japan and other countries, advanced television systems committee standards (ATSC) employed in the United States and other countries, and digital video broadcasting (DVB), which is a scheme employed in European countries. In addition, the present technology may be employed by not only ground digital television broadcasting but also digital satellite television broadcasting, digital cable television broadcasting, and other broadcasting.

<8. Configuration of Computer>

Figure 33:
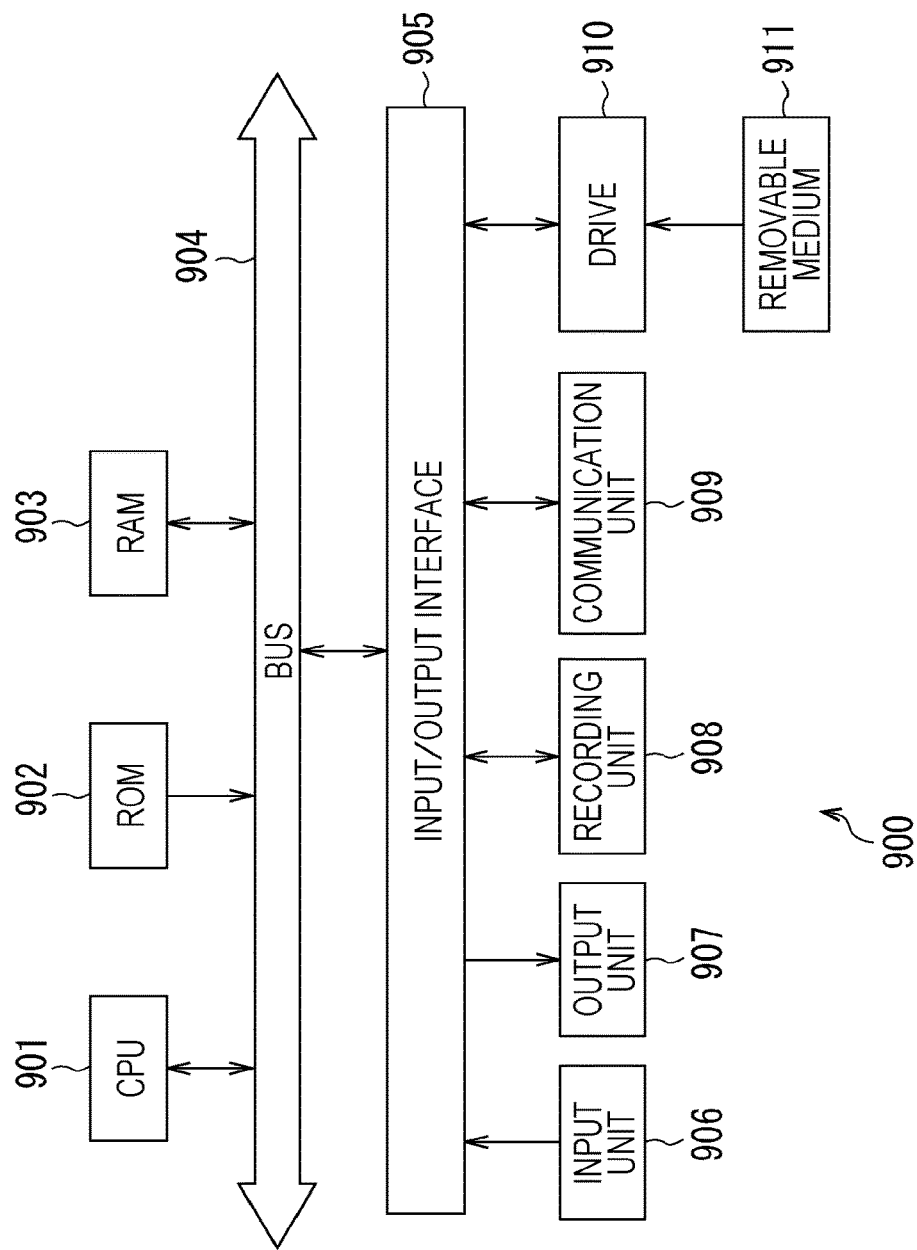
FIG. 33 is a diagram illustrating an exemplary configuration of a computer.

The above-described series of processes can be executed by hardware, and can be executed by software. In a case where the series of processes is executed by software, a program that constitutes the software is installed in a computer. FIG. 33 is a diagram illustrating an exemplary configuration of hardware of the computer that executes the above-described series of processes using the program.

In a computer 900, a central processing unit (CPU) 901, a read only memory (ROM) 902, and a random access memory (RAM) 903 are connected to each other via a bus 904. An input/output interface 905 is further connected to the bus 904. An input unit 906, an output unit 907, a recording unit 908, a communication unit 909, and a drive 910 are connected to the input/output interface 905.

The input unit 906 includes a keyboard, a mouse, a microphone, or the like. The output unit 907 includes a display, a speaker, or the like. The recording unit 908 includes a hard disk, a nonvolatile memory, or the like. The communication unit 909 includes a network interface or the like. The drive 910 drives a removable medium 911, such as a magnetic disk, an optical disc, a magneto-optical disc, or a semiconductor memory.

In the computer 900 configured as described above, the above-described series of processes is performed by the CPU 901 loading the program recorded in the ROM 902 or the recording unit 908 to the RAM 903 via the input/output interface 905 and the bus 904, and executing the program.

The program to be executed by the computer 900 (CPU 901) can be recorded and provided, for example, on the removable medium 911 as a package medium or the like. In addition, the program can be provided via a wired or wireless transmission medium, such as a local area network, the Internet, and digital satellite broadcasting.

In the computer 900, the program can be installed in the recording unit 908 via the input/output interface 905 by loading the removable medium 911 in the drive 910. In addition, the program can be received by the communication unit 909 via a wired or wireless transmission medium, and can be installed in the recording unit 908. Besides this, the program can be installed in advance in the ROM 902 or the recording unit 908.

Here, in the present specification, the process the computer performs in accordance with the program does not necessarily need to be performed in time sequence in the order described as flowcharts. That is, the process the computer performs in accordance with the program also includes processes to be performed in parallel or individually (for example, parallel processing or processing by an object). In addition, the program may be processed by one computer (processor), and distributed processing may be performed by a plurality of computers.

Note that embodiments of the present technology are not limited to the above-described embodiment, but various changes can be made without departing from the spirit of the present technology.

In addition, the present technology can have the following configurations.

(1) A reception apparatus including:
    a reception unit that receives broadcast content provided as a pay broadcast service, the broadcast content being transmitted in a scrambled manner;
    an acquisition unit that acquires a subscription check application for checking presence of a subscription to the pay broadcast service depending on information indicating presence of the subscription check application, the information being included in control information including information regarding a structure of the broadcast content; and
    a control unit that controls an operation of the subscription check application.

(2) The reception apparatus according to (1), in which
    in a case where the subscription check application exists, when it is confirmed by executing the subscription check application that the subscription to the pay broadcast service has not been made, the acquisition unit acquires a promotion application for introducing the broadcast content,
    when it is confirmed by executing the subscription check application that the subscription to the pay broadcast service has been made, the acquisition unit acquires a conjunction application to be executed in conjunction with the descrambled broadcast content, and
    the control unit causes transition from the subscription check application to one of the promotion application and the conjunction application to control an operation of one of the promotion application and the conjunction application.

(3) The reception apparatus according to (2), in which
    in a case where the subscription to the pay broadcast service is made by a non-subscribing user by executing the promotion application, the acquisition unit acquires the conjunction application to be executed in conjunction with the descrambled broadcast content, and the control unit executes the conjunction application in conjunction with the broadcast content.

(4) The reception apparatus according to (2) or (3), in which the control information is transmitted in a non-scrambled manner,
the subscription check application is transmitted in a non-scrambled manner,
the promotion application is transmitted in a non-scrambled manner, and
the conjunction application is transmitted in a scrambled manner.

(5) The reception apparatus according to any of (2) to (4), in which
the subscription check application, the promotion application, and the conjunction application are transmitted as data, and
the control information includes application control information for controlling an application and data transmission information including information regarding data transmission.

(6) The reception apparatus according to (5), in which
a single service is provided as the pay broadcast service, and
the broadcast content, the control information, the application control information, the data transmission information, the subscription check application, the promotion application, and the conjunction application are transmitted as streams of the pay broadcast service.

(7) The reception apparatus according to (5), in which
a plurality of services are provided as the pay broadcast service,
the broadcast content, the control information, and the conjunction application are transmitted as streams of the pay broadcast service, and
the application control information, the data transmission information, the subscription check application, and the promotion application are transmitted as streams common to other pay broadcast services.

(8) The reception apparatus according to any of (1) to (7), in which in the subscription check application, a function of checking the presence of the subscription to the pay broadcast service is provided by an application programming interface (API).

(9) The reception apparatus according to any of (1) to (8), in which
an MPEG media transport (MMT) scheme is employed as a media transport scheme, and
the information indicating the presence of the subscription check application is an application initiative flag described in an access control descriptor placed in an MMT package table (MPT).

(10) A reception method of a reception apparatus, the reception method including the steps of, by the reception apparatus:
receiving broadcast content provided as a pay broadcast service, the broadcast content being transmitted in a scrambled manner;
acquiring a subscription check application for checking presence of a subscription to the pay broadcast service depending on information indicating presence of the subscription check application, the information being included in control information including information regarding a structure of the broadcast content; and
controlling an operation of the subscription check application.

(11) A transmission apparatus including:
a generation unit that generates control information including information regarding a structure of broadcast content to be provided as a pay broadcast service, the control information including information indicating presence of a subscription check application for checking presence of a subscription to the pay broadcast service; and
a transmission unit that transmits the control information to be transmitted in a non-scrambled manner together with the broadcast content to be transmitted in a scrambled manner.

(12) The transmission apparatus according to (11), in which in a case where the subscription check application exists, the transmission unit transmits the subscription check application, a promotion application for introducing the broadcast content, and a conjunction application to be executed in conjunction with the descrambled broadcast content.

(13) The transmission apparatus according to (12), in which the subscription check application is transmitted in a non-scrambled manner,
the promotion application is transmitted in a non-scrambled manner, and
the conjunction application is transmitted in a scrambled manner.

(14) The transmission apparatus according to (12) or (13), in which
the subscription check application, the promotion application, and the conjunction application are transmitted as data, and
the control information includes application control information for controlling an application and data transmission information including information regarding data transmission.

(15) The transmission apparatus according to (14), in which
a single service is provided as the pay broadcast service, and
the broadcast content, the control information, the application control information, the data transmission information, the subscription check application, the promotion application, and the conjunction application are transmitted as streams of the pay broadcast service.

(16) The transmission apparatus according to (14), in which
a plurality of services are provided as the pay broadcast service,
the broadcast content, the control information, and the conjunction application are transmitted as streams of the pay broadcast service, and
the application control information, the data transmission information, the subscription check application, and the promotion application are transmitted as streams common to other pay broadcast services.

(17) The transmission apparatus according to any of (11) to (16), in which
an MMT scheme is employed as a media transport scheme, and
the information indicating the presence of the subscription check application is an application initiative flag described in an access control descriptor placed in an MPT.

(18) A transmission method of a transmission apparatus, the transmission method including the steps of, by the transmission apparatus:
generating control information including information regarding a structure of broadcast content to be provided as a pay broadcast service, the control information including information indicating presence of a subscription check application for checking presence of a subscription to the pay broadcast service; and transmitting the control information to be transmitted in a non-scrambled manner together with the broadcast content to be transmitted in a scrambled manner.

REFERENCE SIGNS LIST

1 Broadcast communication system
10 Transmission apparatus
20 Reception apparatus
30 Server
80 Transmission channel
90 Internet
119 Application generation unit
120 Application processing unit
121 MMT-SI generation unit
122 MMT-SI processing unit
123 TLV-SI generation unit
124 TLV-SI processing unit
125 Scheduler
126 Multiplexer
127 Scrambler
128 Transmission unit
212 Tuner
213 Descrambler
214 CAS platform
215 Demultiplexer
216 System control unit
218 Memory
225 Application control unit
226 Application engine
227 Communication unit
900 Computer
901 CPU

The invention claimed is:

1. A reception apparatus comprising:
circuitry configured to
receive broadcast content provided as a pay broadcast service, the broadcast content being transmitted in a scrambled manner;
acquire a subscription check application for checking presence of a subscription to the pay broadcast service depending on information indicating presence of the subscription check application, the information being included in control information including information regarding a structure of the broadcast content;
control an operation of the subscription check application;
acquire a promotion application in response to a determination that the subscription to the pay broadcast service is not present; and
acquire a conjunction application in response to a determination that the subscription to the pay broadcast service is present;
wherein the subscription check application is transmitted in a non-scrambled manner, the promotion application is transmitted in a non-scrambled manner, and the conjunction application is transmitted in a scrambled manner.

2. The reception apparatus according to claim 1, wherein the circuitry is further configured to cause a transition from the subscription check application to one of the promotion application and the conjunction application to control an operation of one of the promotion application and the conjunction application.

3. The reception apparatus according to claim 2, wherein the circuitry is further configured to
executes execute the conjunction application in conjunction with the broadcast content when a non-subscribing user subscribes to the pay broadcast service via the promotion application.

4. The reception apparatus according to claim 1, wherein the subscription check application, the promotion application, and the conjunction application are transmitted as data, and
the control information includes application control information for controlling the subscription check application and data transmission information including information regarding data transmission.

5. The reception apparatus according to claim 4, wherein a single service is provided as the pay broadcast service, and
the broadcast content, the control information, the application control information, the data transmission information, the subscription check application, the promotion application, and the conjunction application are transmitted as streams of the pay broadcast service.

6. The reception apparatus according to claim 4, wherein a plurality of services are provided as the pay broadcast service,
the broadcast content, the control information, and the conjunction application are transmitted as streams of the pay broadcast service, and
the application control information, the data transmission information, the subscription check application, and the promotion application are transmitted as streams common to other pay broadcast services.

7. The reception apparatus according to claim 1, wherein in the subscription check application, a function of checking the presence of the subscription to the pay broadcast service is provided by an application programming interface (API).

8. The reception apparatus according to claim 1, wherein an MPEG media transport (MMT) scheme is employed as a media transport scheme, and
the information indicating the presence of the subscription check application is an application initiative flag described in an access control descriptor placed in an MMT package table (MPT).

9. A reception method of a reception apparatus, the reception method comprising:
receiving broadcast content provided as a pay broadcast service, the broadcast content being transmitted in a scrambled manner;
acquiring a subscription check application for checking presence of a subscription to the pay broadcast service depending on information indicating presence of the subscription check application, the information being included in control information including information regarding a structure of the broadcast content;
controlling an operation of the subscription check application;
acquiring a promotion application in response to a determination that the subscription to the pay broadcast service is not present; and
acquiring a conjunction application in response to a determination that the subscription to the pay broadcast service is present;
wherein the subscription check application is transmitted in a non-scrambled manner, the promotion application is transmitted in a non-scrambled manner, and the conjunction application is transmitted in a scrambled manner.

10. A transmission apparatus comprising circuitry configured to:
generate control information including information regarding a structure of broadcast content to be provided as a pay broadcast service, the control information including information indicating presence of a subscription check application for checking presence of a subscription to the pay broadcast service; and
transmission circuitry configured to
transmit the control information in a non-scrambled manner and the broadcast content in a scrambled manner,
transmit the subscription check application,
transmit a promotion application to be acquired by a reception apparatus based on a determination that the subscription to the pay broadcast service is not present, and
transmit a conjunction application to be acquired by the reception apparatus based on a determination that the subscription to the pay broadcast service is present;
wherein the subscription check application is transmitted in a non-scrambled manner, the promotion application is transmitted in a non-scrambled manner, and the conjunction application is transmitted in a scrambled manner.

11. The transmission apparatus according to claim 10, wherein the promotion application introduces the broadcast content, and the conjunction application is executed in conjunction with the descrambled broadcast content.

12. The transmission apparatus according to claim 10, wherein
the subscription check application, the promotion application, and the conjunction application are transmitted as data, and
the control information includes application control information for controlling the subscription check application and data transmission information including information regarding data transmission.

13. The transmission apparatus according to claim 12, wherein
a single service is provided as the pay broadcast service, and
the broadcast content, the control information, the application control information, the data transmission information, the subscription check application, the promotion application, and the conjunction application are transmitted as streams of the pay broadcast service.

14. The transmission apparatus according to claim 12, wherein
a plurality of services are provided as the pay broadcast service,
the broadcast content, the control information, and the conjunction application are transmitted as streams of the pay broadcast service, and
the application control information, the data transmission information, the subscription check application, and the promotion application are transmitted as streams common to other pay broadcast services.

15. The transmission apparatus according to claim 10, wherein
an MMT scheme is employed as a media transport scheme, and
the information indicating the presence of the subscription check application is an application initiative flag described in an access control descriptor placed in an MPT.

16. A transmission method of a transmission apparatus, the transmission method comprising:
generating, using circuitry, control information including information regarding a structure of broadcast content to be provided as a pay broadcast service, the control information including information indicating presence of a subscription check application for checking presence of a subscription to the pay broadcast service;
transmitting the control information in a non-scrambled manner together with the broadcast content in a scrambled manner;
transmitting the subscription check application;
transmitting a promotion application to be acquired by a reception apparatus based on a determination that the subscription to the pay broadcast service is not present; and
transmitting a conjunction application to be acquired by the reception apparatus based on a determination that the subscription to the pay broadcast service is present;
wherein the subscription check application is transmitted in a non-scrambled manner, the promotion application is transmitted in a non-scrambled manner, and the conjunction application is transmitted in a scrambled manner.

* * * * *